United States Patent [19]

Magarian

[11] 4,308,225
[45] Dec. 29, 1981

[54] PRODUCING REINFORCED PLASTIC PIPE WITH A MULTI-MANDREL MACHINE

[75] Inventor: Gerald M. Magarian, Long Beach, Calif.

[73] Assignee: Ameron, Inc., Monterey Park, Calif.

[21] Appl. No.: 122,416

[22] Filed: Feb. 19, 1980

Related U.S. Application Data

[63] Continuation of Ser. No. 824,494, Aug. 15, 1977, abandoned.

[51] Int. Cl.³ .............................................. B29D 23/00
[52] U.S. Cl. .................................. 264/40.6; 264/257; 264/297; 425/384; 425/392; 425/393
[58] Field of Search ............... 264/297, 40.6; 425/392, 425/393, 384

[56] References Cited

U.S. PATENT DOCUMENTS

| | | | |
|---|---|---|---|
| 2,390,533 | 12/1945 | Hill | 425/393 |
| 3,591,896 | 7/1971 | Tartaglia | 425/384 |
| 3,616,063 | 10/1971 | Bradley | 156/425 |
| 4,065,242 | 12/1977 | Dickey | 425/393 |

*Primary Examiner*—James H. Derrington
*Attorney, Agent, or Firm*—Christie, Parker & Hale

[57] ABSTRACT

Plastic pipe is continually produced from a curable resin on a plurality of horizontal mandrels which are repeatedly simultaneously moved between plastic pipe production stations. There is at least one station for applying resin to a mandrel, at least one station for curing resin on the surface of a mandrel, and at least one pipe removal station for removing pipe from a mandrel. The pipe stations are substantially radially equidistant from a central horizontal axis and are circumferentially spaced apart by substantially equal increments around the horizontal axis. Each mandrel is progressively rotated between the stations.

The temperature of each mandrel is controlled by passing a fluid through the mandrel. Heating fluid passes through mandrels in resin cure stations and cooling fluid passes through mandrels in resin application and pipe removal stations. A control system minimizes mixing of the cooling and heating temperature control fluids when the mandrel is rotated between stations. A distributor system distributes temperature control fluids from fluid reservoirs to the mandrels.

Mandrels having a flow path for the temperature control fluid include a cylindrical shell closed at one end and open at the opposed end with a fluid inlet and outlet at the open end. The flow path through the mandrel comprises an open outlet duct within the shell for transferring fluid out of the mandrel through the fluid outlet and an inlet passage between the duct and the inner surface of the shell for transferring fluid into the mandrel from the fluid inlet.

8 Claims, 16 Drawing Figures

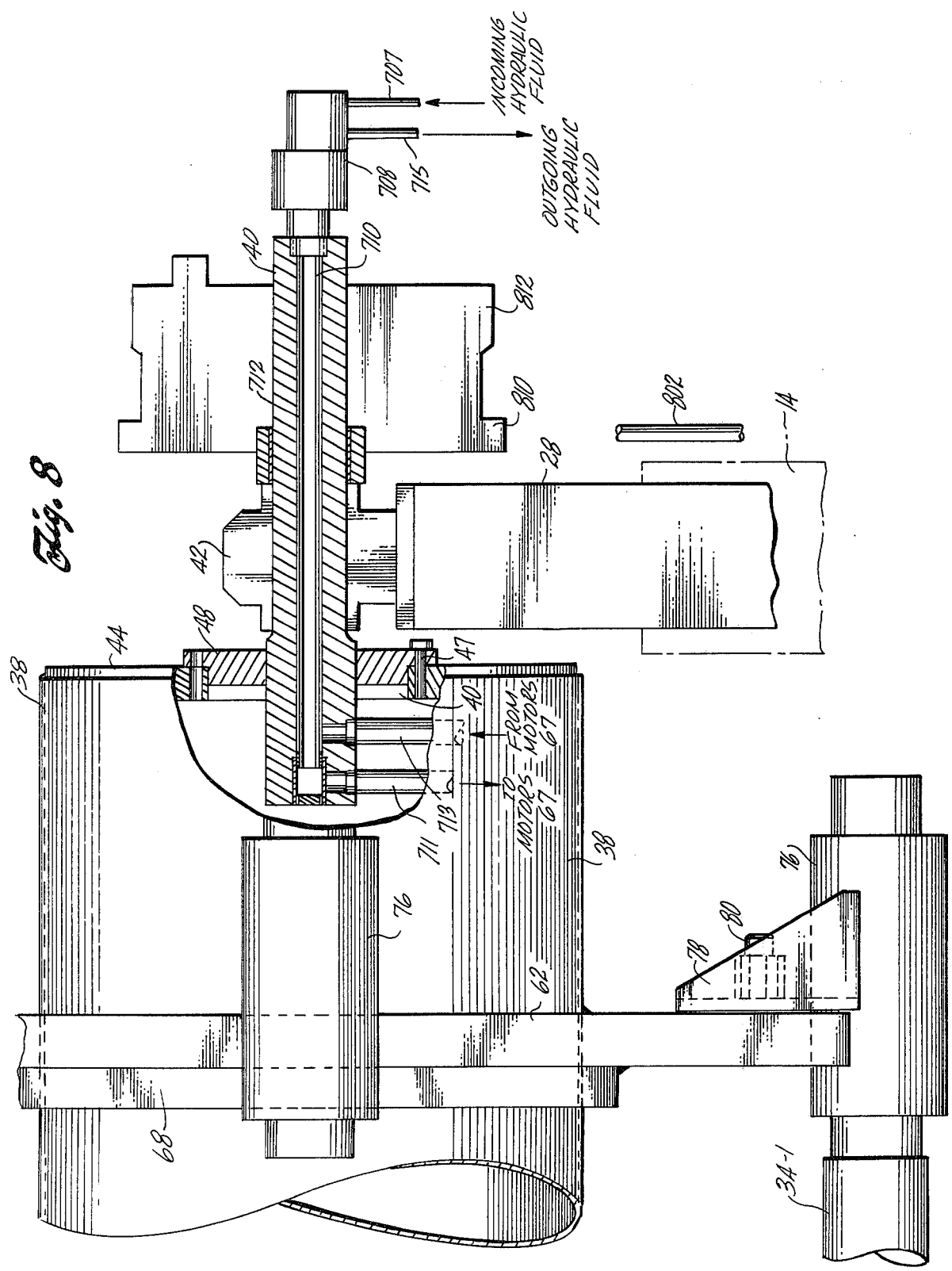

PRODUCING REINFORCED PLASTIC PIPE WITH A MULTI-MANDREL MACHINE

CROSS REFERENCE TO RELATED APPLICATIONS

This is a continuation of application Ser. No. 824,494, filed Aug. 15, 1977, now abandoned.

BACKGROUND OF THE INVENTION

This invention relates to the art of manufacturing plastic pipe.

Fiber reinforced tubular articles such as plastic pipe can be made by winding an inner layer of lining material impregnated with a curable liquid resin around a rotating mandrel coated with a release agent. Next, a band of reinforcing fiber rovings such as fiberglass impregnated with the liquid resin is wound on the rotating mandrel in a helical pattern with several superimposed layers. The resin is then at least partially cured by heat to form reinforced plastic pipe. The pipe is then cooled, removed from the mandrel, and then the mandrel is cleaned and release agent is applied to the surface of the mandrel. After the release agent is applied, the above steps are repeated to form additional pipe on the mandrel. After the pipe is removed from the mandrel it can be subjected to additional post-curing.

Plastic pipe can be manufactured using all or some of these steps. For example, pipe can be manufactured without the lining material, without the reinforcing rovings, or without the release agent being applied to the surface of the mandrel.

In one method of manufacturing reinforced plastic pipe a mandrel is manually carried between three or more processing stations. In a first station lining material, the reinforcing fiber rovings, and the resin are applied to the mandrel. In a second station the resin is cured and in a third station the formed pipe is removed from the mandrel. This method has many disadvantages. Among the disadvantages is the large number of operators required to transfer mandrels between the processing stations. This results in high labor costs for the production of the pipe. Another disadvantage is lack of control of pipe temperature while a mandrel is transferred between production stations. This can result in uneven cure of pipe with lack of uniformity of pipe quality.

A third disadvantage is that resin drips from the surface of the mandrel as the mandrel is transferred between production stations due to lack of rotation of the mandrel. Thus raw materials are lost and a messy working environment results.

In U.S. Pat. No. 3,519,520 a machine is described for manufacturing plastic pipe where all the steps required for forming the pipe are performed with one machine having a single mandrel. Although this machine solves the problems associated with moving a mandrel between production stations, it is a costly way to manufacture pipe because each mandrel requires its own expensive pipe making apparatus. Each mandrel must have means for applying the release agent, equipment for applying a resin impregnated lining, equipment for applying resin impregnated fibers, as well as curing means, cooling means, and stripping means.

It is believed that machines made under U.S. Pat. No. 3,519,520 have three mandrels fixed in a parallel, evenly spaced array in a horizontal plane where one telescoping carriage serves all three mandrels in succession, but each mandrel has its own pipe removal system.

In FIG. 17 of U.S. Pat. No. 3,616,063 issued to Bradley, a machine is shown which overcomes some of the disadvantages of a single mandrel machine. In Bradley's machine a plurality of horizontal mandrels along with rotating means for each mandrel are mounted on a rotating frame. The apparatus looks like a wheel lying on the ground where the spokes of the wheel are formed by the mandrels and the rim of the wheel is formed by a track on which the mandrels are rotated about a central vertical axis. The mandrels are rotated along the track between production stations where each station has the equipment required for the function performed in that station. For example, heating means are provided at a curing station and stripping equipment is provided at a pipe removal station.

A disadvantage with Bradley's multimandrel approach is that much floor space is required to accommodate the mandrels. This increases the capital costs associated with constructing a facility for manufacturing reinforced plastic pipe. Another disadvantage is that it is difficult to remove formed pipe from one of Bradley's mandrels because both ends of the mandrel must be disconnected from a mandrel support, and then the mandrel must be removed from the support apparatus so that the pipe can be stripped from the mandrel. This is a time consuming procedure, and when the mandrel is internally heated with a fluid to cure the resin on the surface of the mandrel, leakage of the fluid onto the pipe with resultant contamination of the pipe can occur.

Therefore, there is a need for a machine and a method for manufacturing reinforced plastic pipe which enjoy low capital and labor costs, as well as permit easy removal of pipe from a mandrel.

SUMMARY OF THE INVENTION

I have invented a method and a machine with the above features. In this method, plastic pipe is continually produced in discrete lengths from a curable resin on a plurality of horizontally oriented mandrels which are repeatedly simultaneously moved between plastic pipe production stations. There is at least one production station for applying resin to a mandrel, at least one production station for curing resin on the surface of the mandrel to produce at least partially cured pipe, and at least one pipe removal production station for removing pipe from the mandrel. The plastic pipe production stations are substantially radially equidistant from a central horizontal axis and are circumferentially spaced apart by substantially equal increments around the horizontal axis. Each mandrel is progressively revolved from a resin application production station to a resin curing production station, then to a pipe removal station, and then back to the resin application station.

Preferably the number of mandrels equals the number of production stations for efficient use of the equipment required to manufacture the pipe. When the number of mandrels equals the number of production stations, the mandrels are simultaneously revolved about the central axis by an increment substantially equal to the incremental distance between the production stations.

The temperature on the surface of each mandrel is adjusted in accordance with the production station occupied by that mandrel. For example, while resin is applied to the surface of a mandrel, the temperature of the surface of the mandrel is maintained below the cure temperature of the resin by passing a cooling fluid having a temperature lower than the cure temperature of the resin from a cooling fluid reservoir through a flow path through the mandrel. Spent cooling fluid exiting from the mandrel is collected in the cooling fluid reservoir. When a mandrel is moved to a resin curing production station, the cure of the applied resin on the mandrel is initiated by stopping the flow of cooling fluid to the mandrel and introducing from a heating fluid reservoir a heating fluid having a temperature greater than the cure temperature of the resin into the mandrel. The heating fluid follows the same flow path followed by the cooling fluid through the mandrel. To conserve heat the fluid exiting from the mandrel is subsequently diverted from the cooling fluid reservoir to a heating fluid reservoir when the temperature of the fluid exiting from the mandrel rises, thereby indicating the presence of heating fluid. Preferably the fluid is diverted when the temperature of the fluid exiting from the mandrel is about halfway between the temperature of the heating fluid and the temperature of the cooling fluid.

Heating fluid is continuously passed through each mandrel in a resin curing production station to cure the resin. When a mandrel is moved from a resin curing production station to a pipe removal production station, the flow of heating fluid into the mandrel is stopped and the flow of a cooling fluid into the mandrel is initiated. The cooling fluid follows the same flow path followed by the heating fluid. The cooling fluid has a temperature below the cure temperature of the resin, and preferably close to ambient temperature, to permit handling of the formed plastic pipe as it is removed from the mandrel. Subsequent to initiating the flow of cooling fluid, the fluid exiting from the mandrel is diverted from the heating fluid reservoir into which the fluid was flowing to a cooling fluid reservoir. This occurs when the temperature of the fluid exiting from the mandrel decreases, thereby indicating the presence of cooling fluid, and preferably when the temperature of the fluid exiting from the mandrel is about halfway between the temperature of the cooling fluid and the heating fluid.

The temperatures of the heating and cooling fluid are adjusted by passing spent fluids exiting from the mandrels through heat transfer zones, a heating zone for the heating fluid and a cooling zone for the cooling fluid. The temperature of the fluids can be adjusted either before or after they pass to their respective reservoirs.

Mandrels preferably used have an elongated, cylindrical shell closed at one end and open at the opposed end. There is a fluid inlet and a fluid outlet at the open end of the shell and a flow path within the shell for the temperature control fluid. The flow path comprises an open outlet duct within the shell for transferring fluid out of the mandrel. The duct is in open communication with the closed end of the shell and the fluid outlet. The flow path also comprises an inlet passage between the duct and the inner surface of the shell for transferring temperature control fluid into the shell. The inlet passage is in open communication with the fluid inlet and the closed end of the shell. With this configuration the temperature control fluid flows into the mandrel through the fluid inlet and thence into the inlet passage of the mandrel. As the fluid flows along the inlet passage to the closed end of the shell, the temperature of the surface of the mandrel is controlled by indirect heat transfer from the fluid. Then the temperature control fluid passes out of the mandrel by flowing from the closed end of the shell, through the outlet duct, and then out through the fluid outlet to be passed to a temperature control fluid reservoir. The advantage of this configuration where both the fluid inlet and the fluid outlet are at the same end of the shell, is that when pipe is removed from the mandrel over the closed end of the shell, temperature control fluid does not contaminate the surface of the mandrel.

Preferably the outlet duct is tubular and coaxial with the cylindrical body for ease of manufacture. Also, preferably there is an insulating region containing insulating material between the inlet passage and the outlet duct. This insulating region prevents fluid flowing out of the mandrel through the outlet duct from undergoing heat exchange with fresh fluid flowing through the inlet passage. The preferred insulating material is air because it is readily available and has a low heat transfer coefficient.

Preferably means are provided for rotating each mandrel about its own longitudinal axis. This prevents resin from dripping from the mandrel in the resin application and resin curing production stations, avoids production of curved pipe due to mandrel sag, and allows production of pipe of uniform wall thickness.

A temperature control fluid distributor is provided for transferring fluid to and from the mandrels. The distributor comprises a first plate transverse to the central axis of the mandrels, the axis about which the mandrels simultaneously intermittently rotate. Means are provided for rotating the first plate as the mandrels revolve about their common central axis by an angle substantially equal to the angle of revolution of the mandrels. A second plate mating with the first plate is provided, the second plate being nonrotating. There is a first set of openings comprising one opening for each mandrel through each plate. This first set of openings serves to transfer fluid to the mandrels. The openings are substantially circumferentially equidistant about the axis of their respective plates so that each opening of the first set of openings through the first plate is aligned with an opening of the first set of openings through the second plate, both before and after the first plate rotates. Similarly, a second set of openings comprising one opening for each mandrel through each plate is provided for transferring fluid from the mandrels. The second set of openings also are substantially circumferentially equidistant about the axis of their respective plates so that each opening of the second set of openings through the first plate is aligned with an opening of the second set of openings through the second plate, both before and after the first plate rotates. Means are provided for passing incoming temperature control fluid to each opening of the first set of openings through the second plate. The incoming fluid passes through an aligned opening in the first set of openings through the first plate and thence to a mandrel. Means are also provided for passing spent temperature control fluid from each mandrel to an opening of the second set of openings through the first plate. The spent fluid passing from each mandrel then passes into an aligned opening of the second set of openings through the second plate and is then transferred to a temperature control fluid reservoir. Sealing means are provided for preventing fluid from leaking between the mating surfaces of the plate. The sealing means can be secured to either the surface of the second plate mating with the first plate or the surface of the first plate mating with the second plate. The sealing means are positioned around each opening through the plate of which the sealing means are secured.

These and other features, aspects and advantages of the present invention will become more apparent from the accompanying drawings, following description of the invention, and appended claims.

DRAWINGS

FIG. 8 is a detailed view in partial section of the area 8 of FIG. 1;

DESCRIPTION OF THE INVENTION

Figure 1:
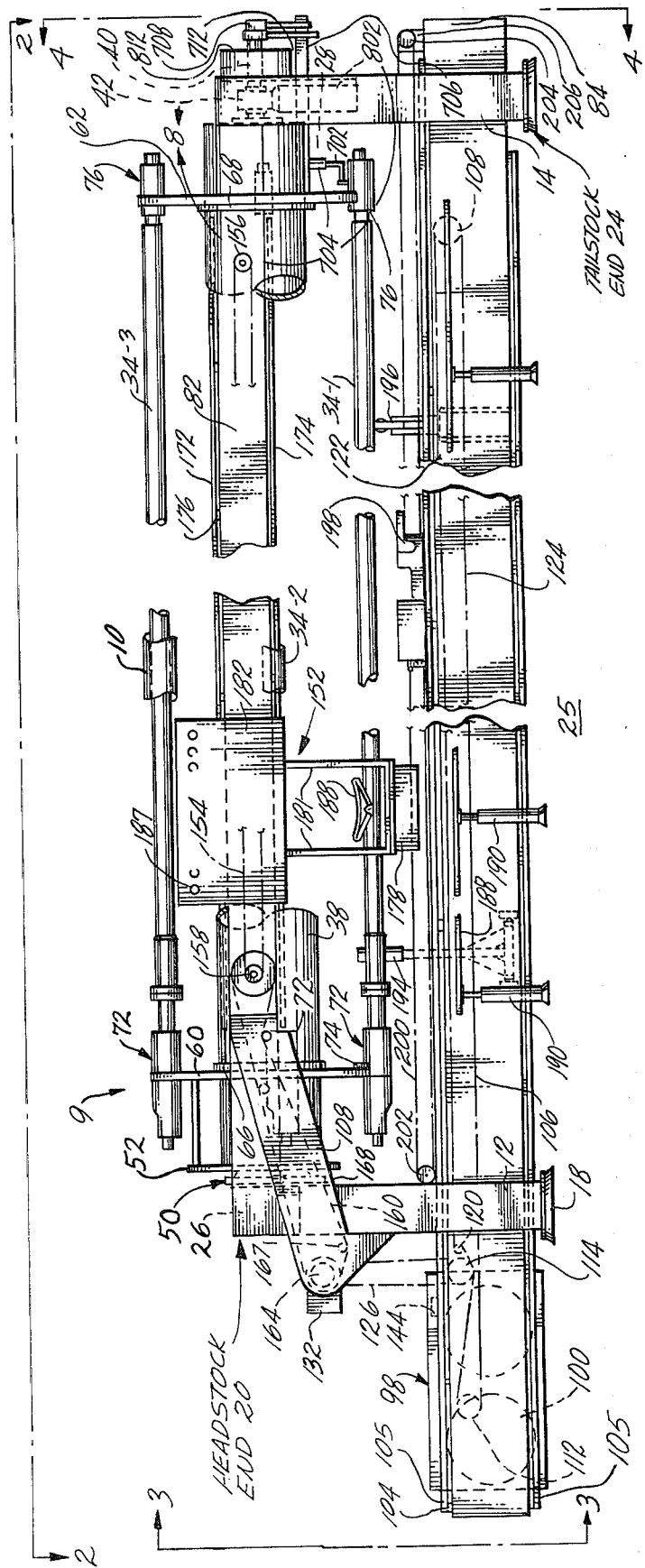
FIG. 1 is a side elevation view of a pipe-making machine showing the general relationship of the components of the machine.

Referring to FIGS. 1–4, a machine 9 for continuously producing plastic pipe 10 from a curable resin include a frame 11 which has four vertical columns 12, 13, 14, 15 at the corners of the machine. The lower ends of columns 12 and 13 are welded to the left and right ends, respectively, of an elongated, horizontal, and transverse bed plate 18 at the headstock end 20 of the machine. Correspondingly, the lower ends of columns 14 and 15 are welded to the left and right sides of a similar horizontal bed plate 22 at the tailstock 24 end of the machine. All expressions of directions used herein are given from the point of view of an observer looking at the machine along the length of the machine from the tailstock end. For convenience, directions are labeled in FIGS. 2 and 4.

Both bed plates are mounted on the floor 25. A cross beam 26 extends between the upper portion of the headstock columns 12, 13. This beam is irregularly shaped, having a dog leg 27 along the bottom 29 of the beam toward the right side of the machine so that the right side of the beam is closer to the floor. There is a box beam 28 between the columns 14, 15 at the tailstock end.

The plastic pipe 10 is formed on six rotatable, elongated, horizontal mandrels 34-1 through 34-6. The mandrels are substantially radially equidistant about the central horizontal axis of a horizontal mandrel carrier tube 38, described below. The mandrels are circumferentially spaced apart by substantially equal increments around this axis. Looking down the length of the machine from the tailstock end (FIG. 4) mandrel 34-1 is in the 7 o'clock position, mandrel 34-2 is in the 9 o'clock position, mandrel 34-3 is in the 11 o'clock position, etc. Each mandrel occupies a production station for producing elastic pipe. Mandrel 34-1 is in a station 58A where lining material (not shown), resin (not shown) and rovings 186 are applied to the mandrel. In the stations 58B, 58C, 58D, and 58E occupied by the mandrels 34-2, 34-3, 34-4 and 34-5, respectively, resin on the surface of the mandrels is progressively cured to form at least partially cured pipe. In the production station 58F occupied by the mandrel 34-6, cured pipe is removed from the mandrel. The mandrel is then cleaned, and a release agent is applied to the mandrel surface to aid in removal of pipe from the mandrel.

Each mandrel has an independent drive, described below, for rotating each mandrel about its own axis. In addition, a drive assembly 59, described below, is provided for repeatedly simultaneously revolving all the mandrels about the longitudinal axis of the mandrel carrier tube by an increment substantially equal to the circumferential increment between the mandrels so that each mandrel, both before and after being revolved, occupies a production station. Thus, mandrel 34-1 is revolved to the position occupied by mandrel 34-2, mandrel 34-2 is revolved to the position occupied by mandrel 34-3, etc. Plastic pipe is formed by applying resin and, if desired, liner material and rovings to the mandrel 34-1 as it rotates in the production station 58A, sequentially revolving mandrel 34-1 through four curing stations 56B–E, and removing pipe which is at least partially cured from the mandrel 34-1 at removal production station 56F occupied by mandrel 34-6 in the Drawings.

An advantage of this scheme described above and shown in the Drawings is that only one set of auxiliary pipe-making equipment is needed for the six mandrels. Savings in capital and operating costs are realized because only one set of equipment for applying resin-impregnated lining material and rovings, for applying resin-impregnated fibers, for curing resin, for cleaning mandrels, for stripping pipe from a mandrel, etc., is required for the six mandrels. Another advantage of this machine is that this ferris wheel type configuration requires relatively little floor space compared to prior art apparatuses for simultaneously manufacturing six pieces of plastic pipe.

The six mandrels are supported by a mandrel support assembly which comprises an elongated, horizontal, cylindrical, hollow mandrel carrier tube 38 extending the length of the pipe-making machine. The mandrels are radially equidistant from the tube, as noted above. As shown in FIG. 8, the tube 38 is supported at the tailstock end of the machine by a horizontal hollow shaft 40 mounted in pillow block bearings 42 on the top of the tailstock cross beam 28 and the right tailstock column 15.

Figure 2:
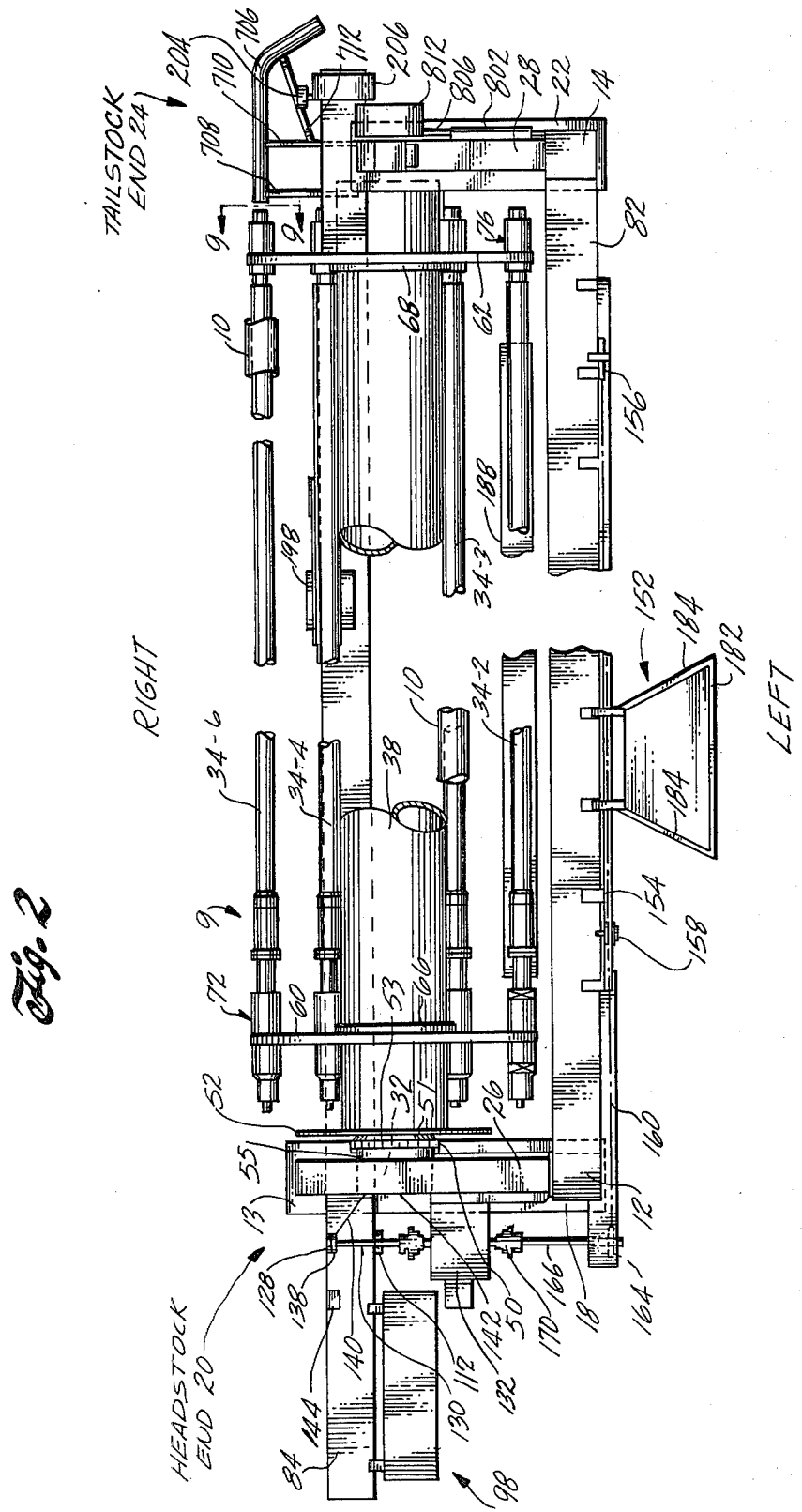
FIG. 2 is a top view of the pipe making-machine of FIG. 1 taken on line 2—2 of FIG. 1.
Figure 5:
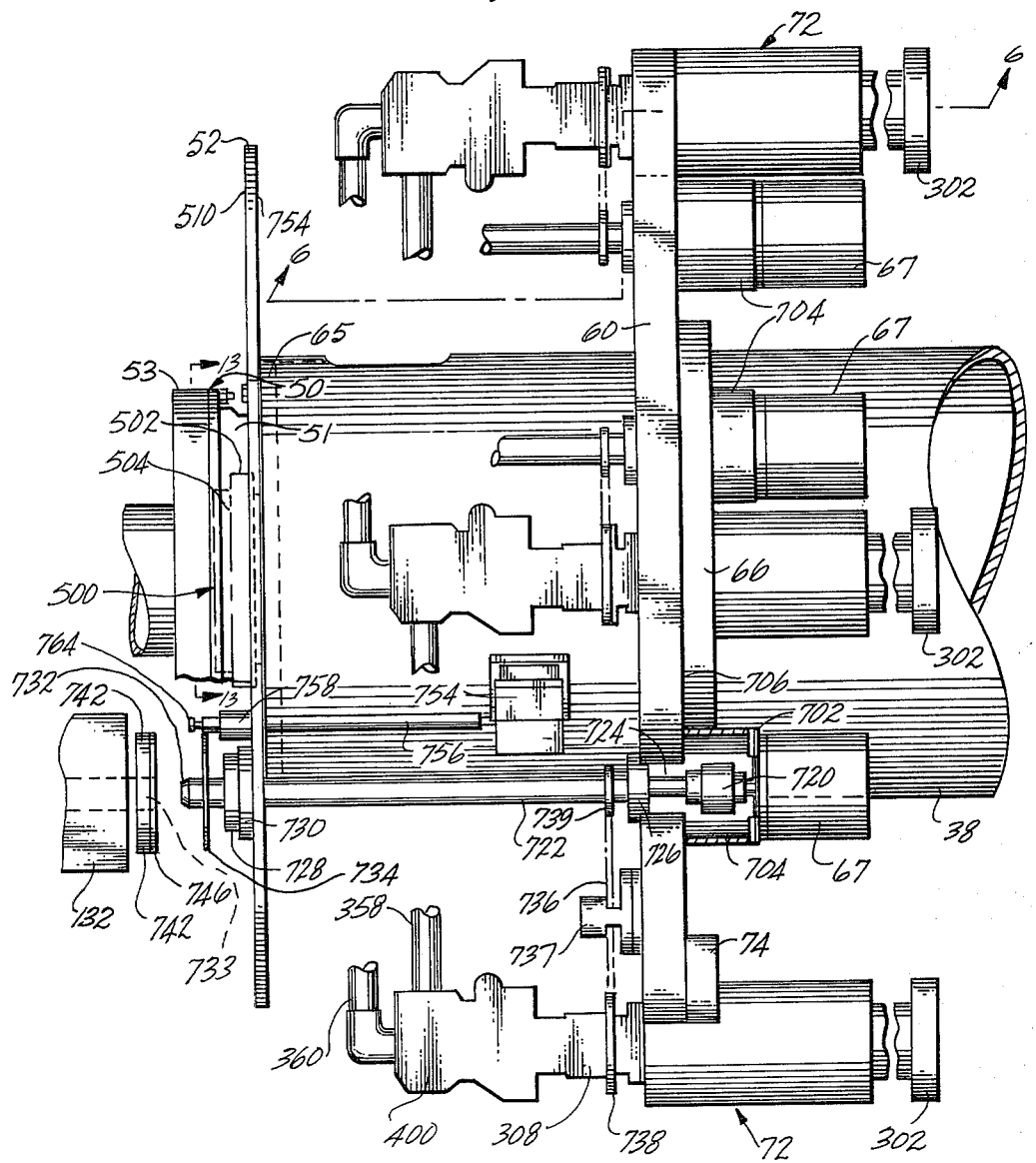
FIG. 5 is a side elevational view in partial section of a portion of the headstock assembly of the pipe making-machine taken on line 5—5 of FIG. 3.

As shown in FIGS. 2 and 5, the headstock end of the carrier tube is supported by a bearing assembly 50. The rotating portion 51 of the bearing assembly is bolted to a vertical plate 52 having a hole through the middle aligned with a hole 57 through the headstock cross beam 26. Plate 52 is bolted to a cylindrical plate 65 at the headstock end of the carrier tube. The fixed portion 53 of the bearing assembly 50 is bolted to a flange 54 around the periphery of a horizontal tube 55 lining the cylindrical hole 57 through the cross beam 26 at the headstock end of the machine.

Figure 9:
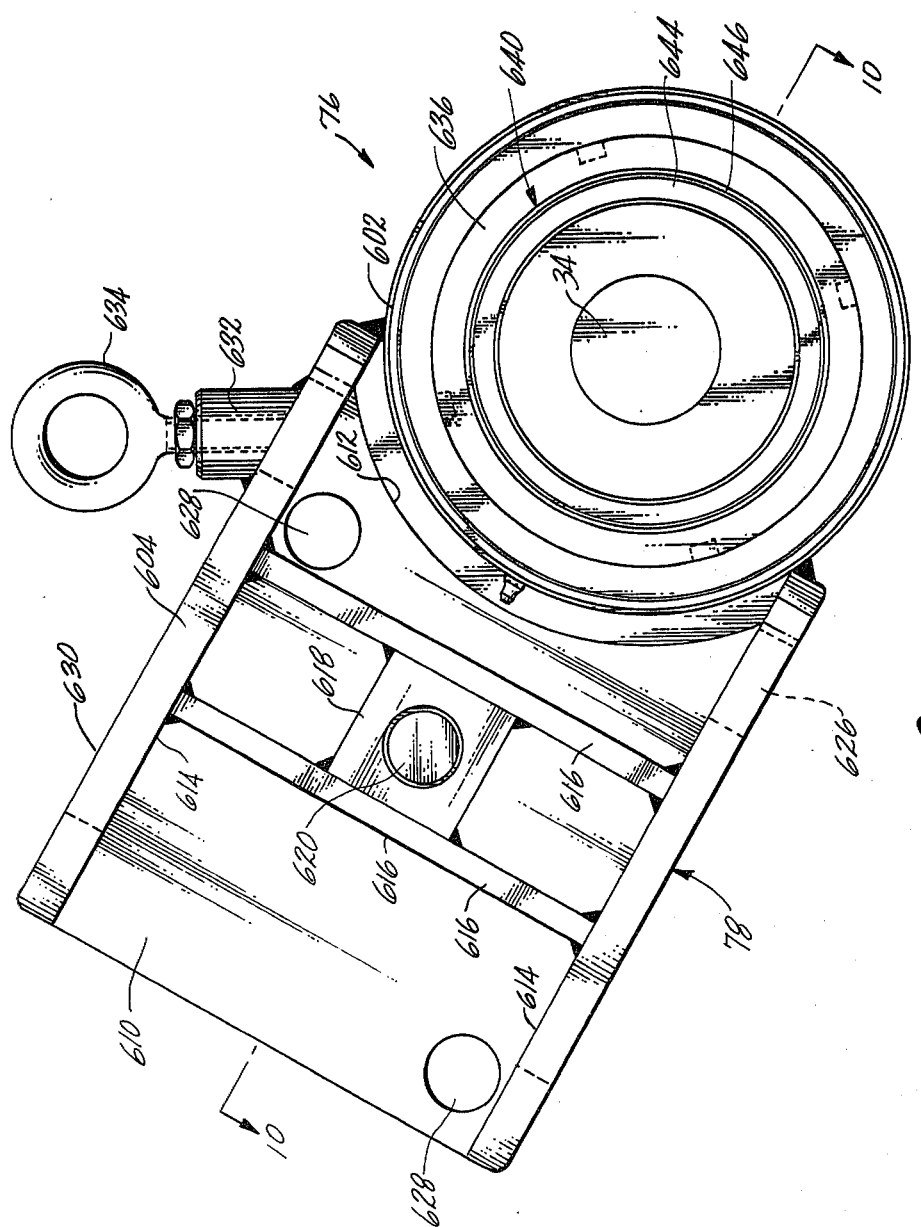
FIG. 9 is a view in section of a mandrel tailstock support assembly taken on line 9—9 of FIG. 2.
Figure 10:
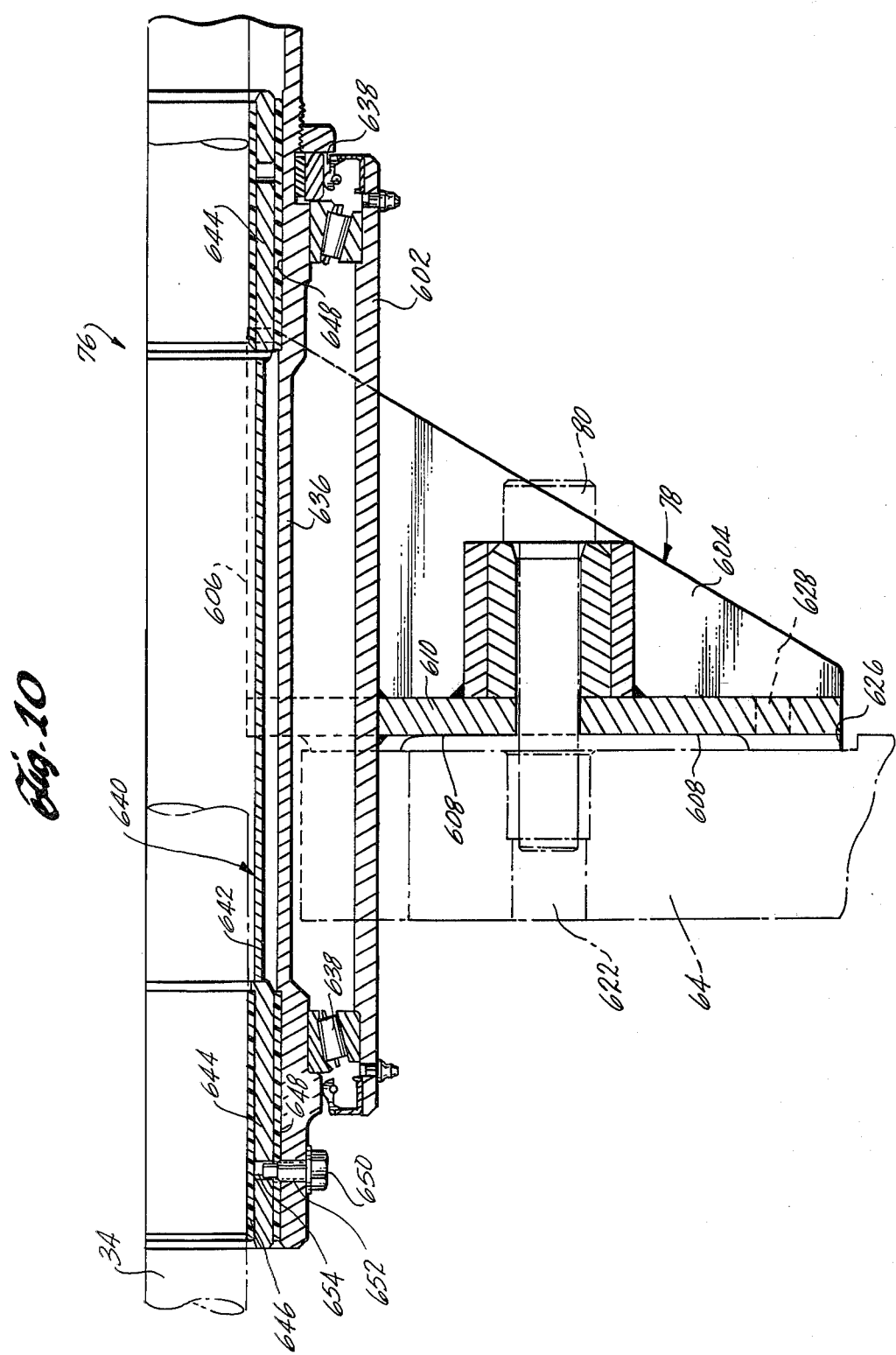
FIG. 10 is a view taken on line 10—10 of FIG. 9, rotated 120 clockwise.

The mandrel support assembly also comprises two vertical, irregularly shaped headstock and tailstock mandrel support plates, 60, 62, respectively, each having six arms 64 extending radially from the center of the plates and a hole 65 through the middle of each plate for mounting the plate on opposite ends of the mandrel carrier tube 38. The headstock support plate 60 is welded to a positioning ring 66 welded to the carrier tube toward the headstock end of the tube. The tailstock mandrel support plate 62 similarly is welded to a positioning ring 68 which is welded to the carrier tube toward the tailstock end of the tube. Each arm 64 of the support plates 60, 62 has a semicircularly cut-out peripheral edge 70. A horizontal, cylindrical headstock support assembly 72 for each mandrel is mounted flush with the peripheral edge of the projections of the headstock plate and is bolted to the plates with a flange 74 projecting radially inwardly from the surface of the support assembly. The headstock end of each mandrel is secured by bolts (not shown) to the headstock support assembly. The tailstock end of each mandrel is journaled in a tailstock support assembly 76 mounted on the tailstock support plate 62 flush with the semicircular peripheral edge 70 of the arms 64. As shown in FIGS. 8-10, each tailstock support assembly 76 is secured to an arm 64 of the tailstock support plate 62 with a gusset assembly 78 projecting radially inwardly towards the carrier tube and a single bolt 80 holding the gusset assembly to an arm 64.

An elongated, horizontal upper box beam 82 on the left, and a similar lower box beam 84 on the right, extend the length of the machine. These two beams support the auxiliary equipment used for producing plastic pipe. The upper beam 82 is welded to and extends between the top portion of the left side headstock 12 and tailstock 14 columns. The lower beam extends beyond the columns 12, 13 at the headstock end of the machine and is supported at the headstock end by a bracket 86 mounted to the surface 88 of the left headstock column facing the headstock end of the machine. Similarly, the lower beam is supported at the tailstock end of the machine by a bracket 90 attached to the lower portion of the surface 92 of the right tailstock column 15 facing the tailstock end of the machine. Because the right headstock 13 and tailstock 15 columns are not aligned, the lower beam is along the inside surface 94 of the right headstock column 13 and the outside surface 96 of the right tailstock column 15. The lower beam extends beyond the support columns at both ends of the machine.

The means for applying liner material impregnated with resin comprises a liner carriage assembly 98 which supports two spools 100 of fibrous reinforcement material, referred to herein as binder material. The liner carriage assembly rides on a pair of parallel, horizontally, vertically spaced apart elongated rails 105 which are cradled by a plurality of struts 104 secured to the top and bottom of the lower box beam 84.

Figure 3:
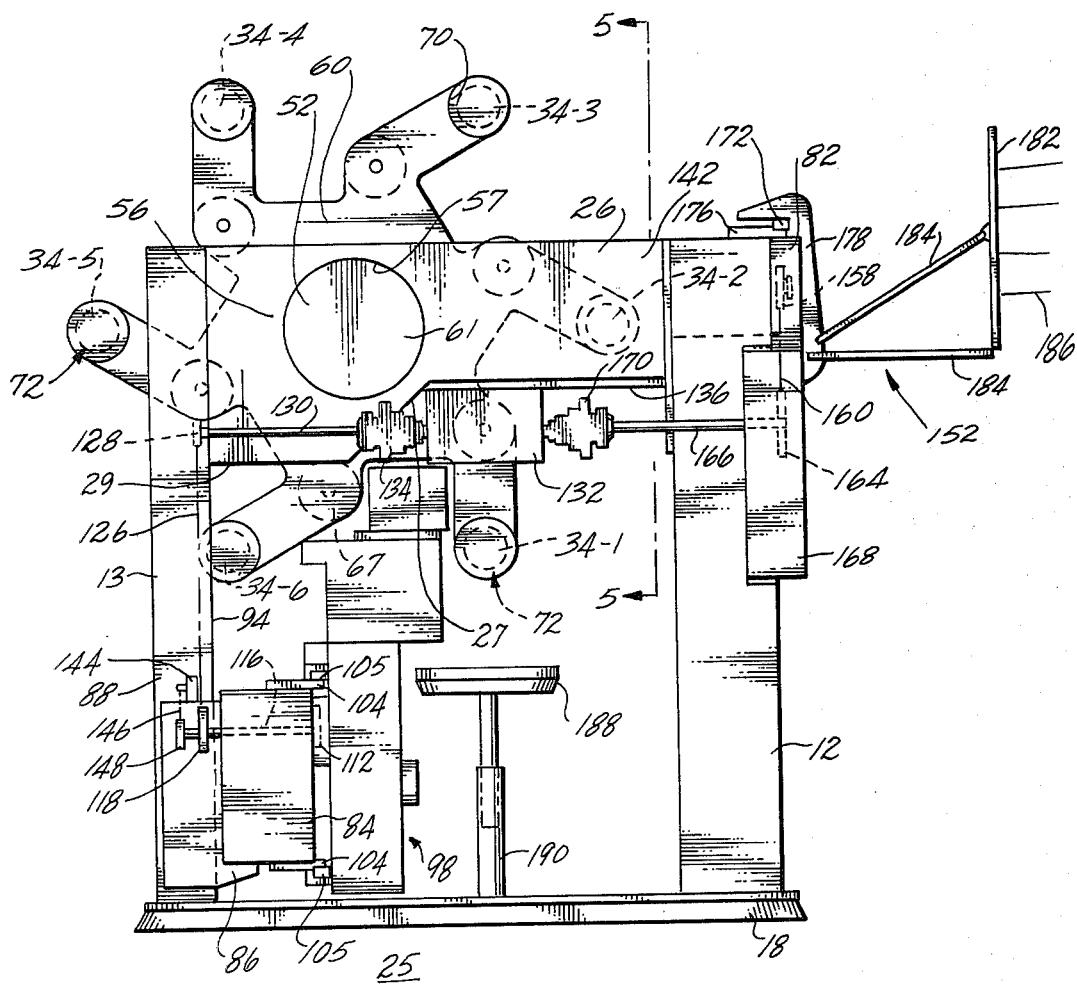
FIG. 3 is an end view of the pipe making-machine of FIG. 1 taken at the headstock end of the machine on line 3—3 in FIG. 1.

As shown in FIGS. 1-3, the liner carriage assembly is pulled longitudinally to and fro along the lower beam by a continuous drive chain 106 which travels over a first end sprocket 108 mounted on the left side of the lower beam 84 towards the tailstock end of the lower beam, and a second end sprocket 112 secured to the left side of the lower beam 84 towards the headstock end of the machine. The drive chain 106 is driven by a drive sprocket 114 mounted on a shaft 116 extending through the lower beam with another sprocket 118 mounted on the opposed end of the shaft 116. The drive chain passes over an idler 120 secured to the lower box beam next to the drive sprocket 114. The idler provides wrap around the drive sprocket. The drive sprocket 114 engages links of the drive chain 106 check traveling along the upper path 122 of the loop while the liner carriage assembly is secured to a link which remains on the lower path 124 of the loop.

The sprocket 118 mounted on the opposed end of the shaft 116 is driven by a vertical, closed-loop chain 126 which in turn is driven by a drive sprocket 128 mounted directly above sprocket 118 on the end of a horizontal drive shaft 130 transverse to the longitudinal axis of the machine. The drive shaft is powered by a hydraulic motor drive assembly 132 through an air actuated friction clutch 134. The hydraulic drive assembly is suspended from a horizontally oriented plate 136 attached to the underside of the cutaway portion to the left of the dog leg 27 of the cross beam 26 at the headstock end of the machine. The end of the drive shaft 130 opposite the drive assembly 132 is supported by a bearing block 138 attached to a support arm 140 projecting from the headstock face 142 of the headstock cross beam 26.

As described below, the hydraulic motor drive assembly 132 also serves to rotate the mandrel occupying the production station 58A in which the liner is applied. This insures that an even and uniform lining material (not shown) is applied to the mandrel in production station 58A because the rotation of the mandrel and the liner carriage assembly 98 are coordinated as the liner carriage assembly travels towards the tailstock end of the machine.

Once the liner carriage assembly reaches the tailstock end of the machine, the hydraulic motor drive assembly automatically disengages from the drive shaft 130 by means of the friction clutch 134 and the liner material is cut. The liner carriage assembly 98 is pulled back to the headstock end of the machine without applying liner to the mandrel by a liner carriage assembly return drive 144 which drives a belt 146 attached to a pulley 148 on the drive shaft 116 on which the liner carriage assembly drive sprocket 114 is mounted. The return drive 144 sits on top of the lower beam.

Mandrels of various diameters can be accommodated by changing any of the three sprockets 112, 118, 128 used to drive the liner carriage assembly.

A roving carriage assembly 152 applies rovings 186 impregnated with resin to a mandrel after the lining material is applied. The roving carriage assembly is pulled along the length of the machine by a first continuous drive chain 154 which travels along the left side of the upper box beam 82 over an end sprocket 156 secured to the left side of the upper beam toward the tailstock end of the machine, and an end sprocket assembly 158 consisting of two sprockets mounted on a single stub shaft attached to the left side of the upper beam 82 towards the headstock end of the machine. The first drive chain 154 is driven by a second continuous drive chain 160 which travels over one of the two sprockets of the end sprocket assembly 158 and a drive sprocket 164 mounted on the end of a horizontal shaft 166 aligned with the drive shaft 130 used for the liner carriage assembly 98 and driven by the same hydraulic drive assembly 132. Since this is the same drive assembly used for rotating a mandrel in the roving application station 56A, the movements of the mandrel and the roving carriage assembly 152 are coordinated so that a uniform layer of rovings can be applied to the mandrel. The second drive chain 160 for the roving carriage assembly travels over a plurality of tensioners 167 mounted on a housing 168. The housing, which protects the second drive chain 160, is bolted to the upper beam 82 and left headstock column 12.

The roving carriage assembly is attached to the first drive chain 154 by a Scotch-yoke mechanism (not shown) so that the assembly can be pulled longitudinally back and forth along the upper beam without reversing the direction of rotation of the drive shaft 166. There is a friction clutch 170 on the drive shaft 166 so that the drive assembly 132 can be used to drive the lining carriage assembly without having to drive the roving carriage assembly. Similarly, the friction clutch 134 on the drive shaft 130 for the liner carriage assembly is used so that the roving carriage assembly can be operated while the liner carriage remains stationary.

The roving carriage assembly 152 travels along the length of the machine over a pair of elongated, vertically spaced apart, horizontal rails, a top rail 172 and a bottom rail 174, each of which is bolted to and supported by a plurality of struts 176 welded to the bottom and top of the upper beam 82. The roving carriage assembly 152 comprises a pair of parallel, spaced-apart, C-shaped plates 178 extending over and under the top and bottom rails, respectively. A resin pot 180 which contains the resin to be applied to the mandrels is suspended from the C-shaped plates by a pair of vertically oriented bars 181.

A vertical bushing board 182 is supported by arms 184 attached to the C-shaped frame members and projecting away from the machine towards the left side. Rovings 186 to be applied to the mandrel are pulled by the rotation of the mandrel through holes 187 through the bushing board, down through the resin pot 178, and over a delivery ring 188 positioned above the surface of the mandrel in the resin application production station 58A. Because of the coordinated movement of the lining carriage assembly and the rotation of the mandrel in production station 56A, a uniformly reinforced pipe wall is formed as a band of rovings is wound in a helix around the mandrel.

Beneath the entire length of the mandrel in the resin application production station 56A is an elongated drip pan 188 supported by a plurality of posts 190 which are adjustable in height. The drip pan collects excess resin applied to the mandrel to maintain a clean working environment and to conserve raw materials.

Pipe is stripped from the mandrel occupying the pipe removal production station 56F. This is effected by removing the tailstock support assembly 76 from the mandrel in the pipe removal station 58F and forming grooves in the pipe 33 wall with a cut-off grinder 194 bolted to the right side of the lower beam 84. An intermediate support 196 also bolted to the right side of the lower beam is raised into contact with the pipe as shown in FIG. 1, and then the grooves formed by the cut-off grinder are engaged with a collar (not shown) placed around the pipe. The collar is then engaged with a stripper carriage assembly 198 which is pulled along the lower beam towards the tailstock end of the machine, thereby removing formed pipe from the mandrel. The stripper carriage assembly has a brush (not shown) for cleaning the mandrel and means (not shown) for applying a release agent to the mandrel. As the stripper carriage assembly is pulled back towards the headstock end of the machine, it both cleans and applies release agent to the mandrel in the pipe removal station 58F.

The stripper carriage assembly is pulled along the top of the lower beam by a chain 200, each end of which is attached to one of the ends of the stripper assembly. The chain 200 is pulled around an end sprocket 202 mounted on the top of the lower beam towards the headstock end of the machine by a drive sprocket 204 which is driven by drive means 206 mounted on top of the lower beam at the tailstock end of the machine. After pipe is removed from the mandrel, the following steps occur sequentially: the tailstock assembly is attached to the mandrel; the intermediate support is lowered; the mandrel is cleaned while release agent is applied to the mandrel; and the mandrel is rotated to the production station 58A where resin is applied.

The apparatus and method of this invention are useful with many liner, roving, and resin systems. The liner can be made of mineral fibers such as glass or asbestos; animal fibers such as wool; vegetable fibers such as cotton; synthetic fibers such as nylon, rayon, Dacron, Orlon, polyesters, polyolefins; and the like.

The reinforcing rovings which can be used are formed as substantially continuous, unidirectional fibers or filaments, and may take the form of mineral fibers such as glass or asbestos; animal fibers such as wool; vegetable fibers such as cotton; and synthetic fibers such as nylon, rayon, Dacron, Orlon; and the like.

The resin or adhesive used for forming the pipe and impregnating lining material may be any thermosetting or thermoplastic resin used in winding or laminating procedures which is compatible with the lining and rovings material. For example, this invention is useful with resin binders containing a thermosetting resin, such as an epoxy, polyester, melamine-formaldehyde, urea-formaldehyde, phenol-formaldehyde, and the like, and resin binders containing a thermoplastic resin, such as polyvinyl chloride, polyvinylidene chloride, and the like.

This machine provides means for controlling the temperature of the resin on the surface of each mandrel by passing a fluid through a flow path through the mandrel. The temperature of the fluid passed through a mandrel depends upon the production station occupied by that mandrel. For example, a cooling fluid having a temperature lower than the cure temperature of resin being applied to a mandrel is pumped through the mandrel when it is in the resin application production station 58A to prevent the resin from curing until the desired amount of resin and rovings is applied to the mandrel.

Curing of resin on the surface of the mandrel is initiated by passing a heating fluid having a temperature greater than the cure temperature of the resin applied to the mandrel through the mandrel in the first resin curing production station 56B. Similarly, the heating fluid is passed through each of the mandrels in the other three resin curing production stations 56C, 56D, 56E. A cooling fluid is pumped through the mandrel in the pipe removal production station 56F to allow easy handling of the formed pipe as it is removed. Preferably the same cooling fluid used for cooling the mandrel in the resin application production station 56A is used for the mandrel in the pipe removal station to minimize the number of temperature control systems.

Figure 11:
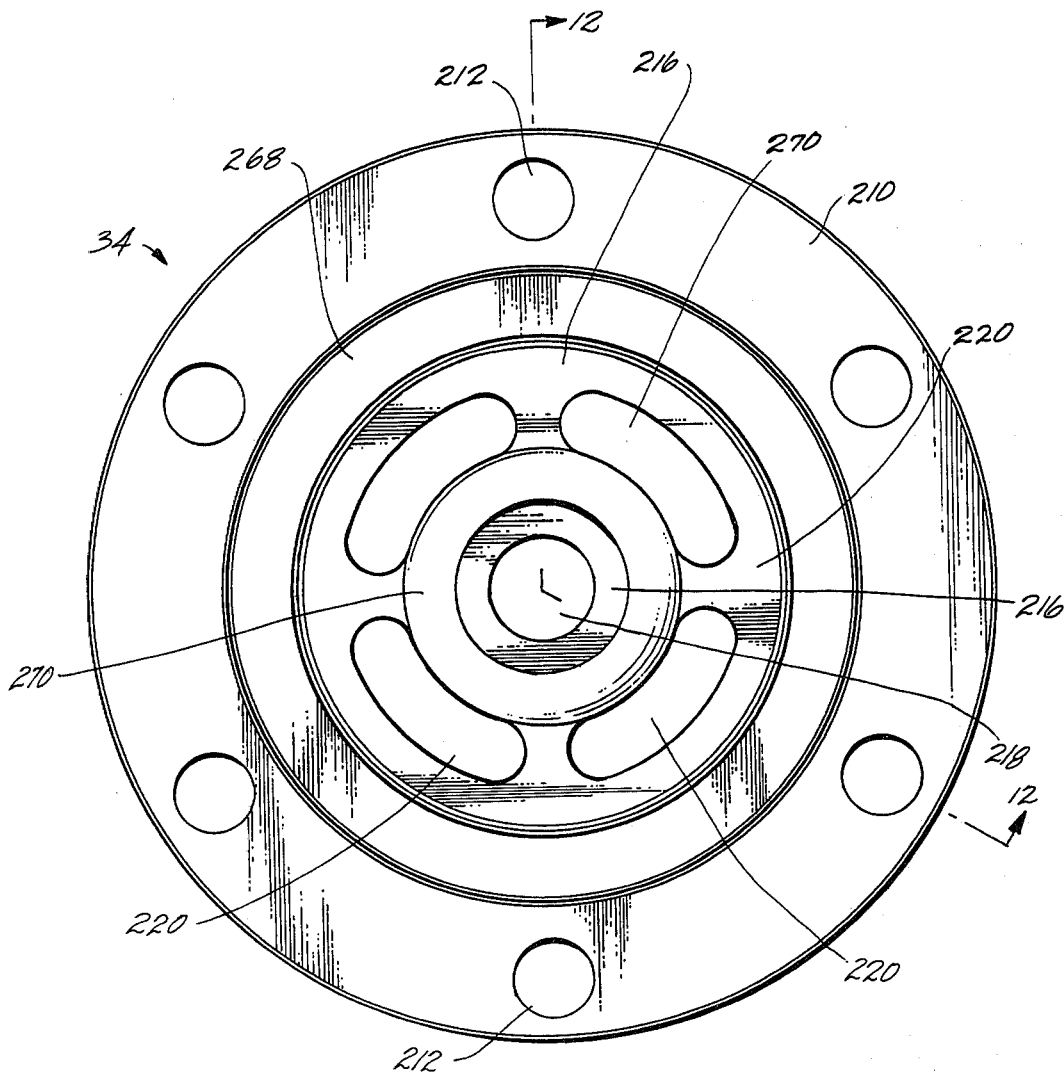
FIG. 11 is an elevational view of the headstock end of a mandrel for use with the pipe-making machine of FIG. 1.
Figure 12:
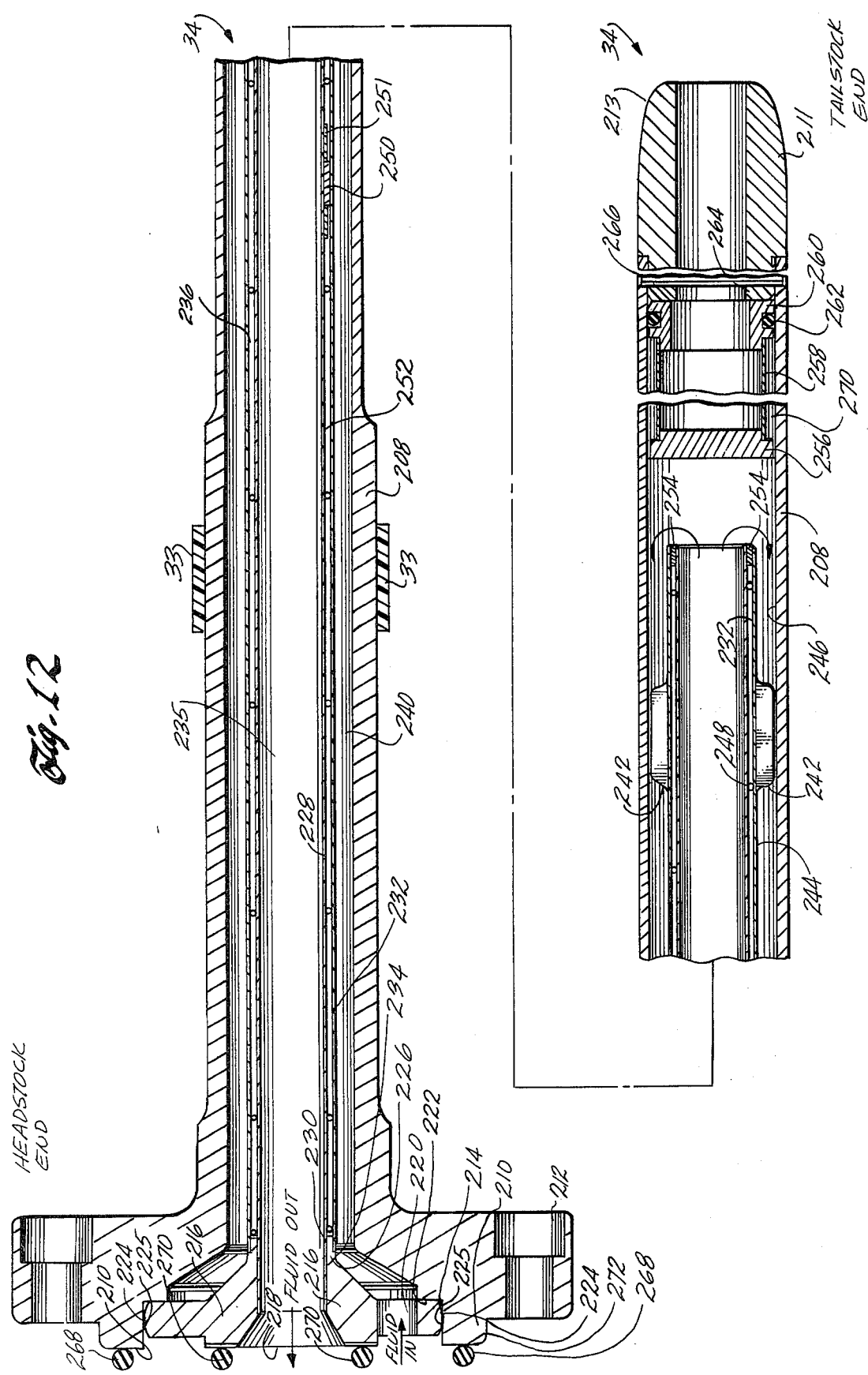
FIG. 12 is a view taken on line 12—12 of FIG. 11.

A mandrel useful with the pipe-making machine of FIGS. 1–4 having a flow path for temperature control fluids will now be described. Referring to FIGS. 11 and 12, a mandrel 34 comprises an elongated tubular shell or body 208 having an annular outer flange 210 at the headstock end and a nose piece 211 at the tailstock end. The nose piece has a rounded surface 213 for sliding into the tailstock support assembly 76. There are a plurality of bolt holes 212 through the periphery of the flange for bolting the flange to the headstock support assembly 72. A shoulder 214 on the radially inner edge of the outer flange supports an inner cylindrical flange 216 having a chamfered hole 218 through the middle. This hole serves as a fluid outlet from the mandrel. Four kidney-shaped holes 220 (FIG. 11) radially equidistant from the center of the inner flange and circumferentially equally spaced apart are the inlet for passing temperature control fluid into the mandrel. The inner flange is pressed against the axially facing surface 222 of the shoulder 214 of the outer flange when the mandrel is bolted to the headstock support assembly 72. The convex outer surface 224 (FIG. 12) of the inner flange engages the radially inwardly facing surface 225 of the shoulder 214.

The inner flange has a thin annular extension 226 around the central hole 218 projecting into the shell 208. There is a inner elongated tube 228 coaxial with and located within the shell and secured to the radially inwardly facing surface 230 of the extension 226. There is an outer elongated tube 232 coaxial with and surrounding the inner tube 228. The outer tube is attached to the radially outer surface 234 of the annular extension 226. The inner tube serves as an outlet passage 235 for the temperature control fluid from the mandrel. Between the outer tube 232 and the shell 208 of the mandrel there is an annular fluid inlet passageway 240 in open communication with the kidney-shaped fluid inlets 220 through the inner flange 216 for the temperature control fluid flowing into the mandrel.

The tubes 228, 232 are supported every few feet along the length of the mandrel by ribs 242 attached to the radially outer surface 244 of the outer tube 232. The ribs slip fit inside the shell 208 to accomodate the large transient difference in longitudinal thermal expansion between the inner tubes and the shell 208.

The tubes are held in spaced-apart relationship by a plurality of pieces of wound wire 248, incrementally spaced apart along the length of the tubes between the tubes. Alternatively, or in addition, plastic Teflon bearings 250 held in place by spaces 251 bonded to the outer surface 252 of the inner tube 228 may be used to maintain the two tubes spaced apart. The annular insulating chamber 236 between the two tubes 228,232 is closed by a plug 254 at the tailstock end of the machine to prevent heat transfer fluid from entering the chamber. This chamber, which insulates the fluid passing into the mandrel from the heat transfer fluid passing out of the mandrel, is filled with an insulating material, such as air or insulating foam.

In practice, temperature control fluid is pumped into the mandrel 34 through the kidney-shaped fluid inlets 220. The fluid flows along the inlet passageway 240 between the shell 208, and the outer tube 232. As the fluid passes along the inlet passage, it controls the temperature of the surface of the mandrel by conductive heat transfer. Spent temperature control fluid passes out of the mandrel through the outlet duct or passage 235 within the inner tube 228 and out through the outlet opening 218 through the inner flange 216.

The temperature control fluid is prevented from passing out of the tailstock end of the mandrel 34 by a cylindrical plug 256. The plug is prevented from sliding axially toward the tailstock end of the mandrel by a short tube 258 extending longitudinally toward the tailstock end of the mandrel. The short tube is coaxial with and spaced apart from the inner wall 246 of the shell 208 and is welded at the end opposite the plug to a retainer 260 for an O-ring 262 held by the retainer against the inner wall 246 of the shell. The O-ring retainer is maintained axially fixed by an axial projection 264 of the nose piece 211 which extends into the shell and seats against the O-ring retainer. The nose piece 211 is secured to the shell with adhesive and a roll pin 266. The O-ring 262 is required because the plug 256 is of smaller diameter than the inner diameter of the shell so that a loose fit is maintained between these two parts to prevent stresses between the plug and the shell as the mandrel rotates. Without the O-ring, temperature control fluid would seep out the tailstock end of the mandrel because of this loose fit.

There are two O-rings, an outer O-ring 268 and an inner O-ring 270 between the flanges 210, 216 at the headstock end of the mandrel and corresponding flanges 316, 318 (FIG. 7) of the headstock support assembly 72. The inner O-ring 270 seats against the inner flange 216 adjacent the chamfered hole 218 to separate temperature control fluid entering the mandrel from spent temperature control fluid passing out of the mandrel. The outer O-ring 268 seats against the surface 210 of the outer flange facing the headstock end of the machine to prevent fluid entering the mandrel from leaking to the ground.

Because the mandrel is supported only at its ends, the outer shell 208 sags. Similarly, the inner and outer tubes also sag. Because of the flexibility of the inner O-ring 270 and the convex surface 224 of the inner flange 216, the shell and the tubes can sag and wobble independently as the inner O-ring is compressed and the convex surface 224 wobbles on the shoulder 214 of the outer flange. Because the shell and the tubes can sag and wobble independently as the mandrel rotates about its longitudinal axis, stresses are prevented which could result in structural failure of the mandrel inner tubes.

Fluids which can be used for the temperature control fluid include oil, water as a cooling fluid, steam as a heating fluid, and hot and cold air. However, water tends to be corrosive and high temperatures can be achieved with steam only at high pressures, which present gasketing problems. Air has insufficient heat capacity for efficient heat transfer. The preferred type of temperature control fluid is a petroleum oil fraction such as Mobiltherm (R) light heat transfer oil available from Mobil Oil Company. Mobiltherm is an aromatic oil, and thus is resistant to thermal cracking under continuous high temperature conditions. Mobiltherm has high specific heat and high thermal conductivity at typical operating conditions. When a heat transfer oil is used, corrosion of the equipment does not result as is the case with water, better heat transfer is obtained than with air, and lower pressures can be used than with steam.

Preferably, the shell is formed from a material such as steel which is a good thermal conductor so that heat is readily transferred to the surface of the mandrel.

The design of the mandrel shown in FIGS. 11 and 12 has many advantages. Among these is because there is little heat transfer between the incoming and outgoing fluid, the hot or cold fluid "slugs" that are discharged when a mandrel temperature is being changed are sharply defined. Another advantage of an insulating chamber is that the mandrel is uniformly cooled and uniformly heated by the temperature control fluid because the chamber prevents incoming fluid from undergoing heat transfer with spent fluid passing out of the mandrel.

A further advantage of the mandrel configuration shown in FIGS. 11 and 12 results from having the fluid inlet and the fluid outlet at the headstock end of the mandrel. When the tailstock support assembly 76 is removed from a mandrel in the pipe removal production station 56, and the pipe formed on the mandrel is removed, temperature control fluid does not leak out of the mandrel and onto the pipe, thereby lessening the value of the pipe. This is an important advantage when using oil as the temperature control fluid since oil contamination on the pipe adversely affects the ability of a customer to bond two pieces of pipe together.

Figure 4:
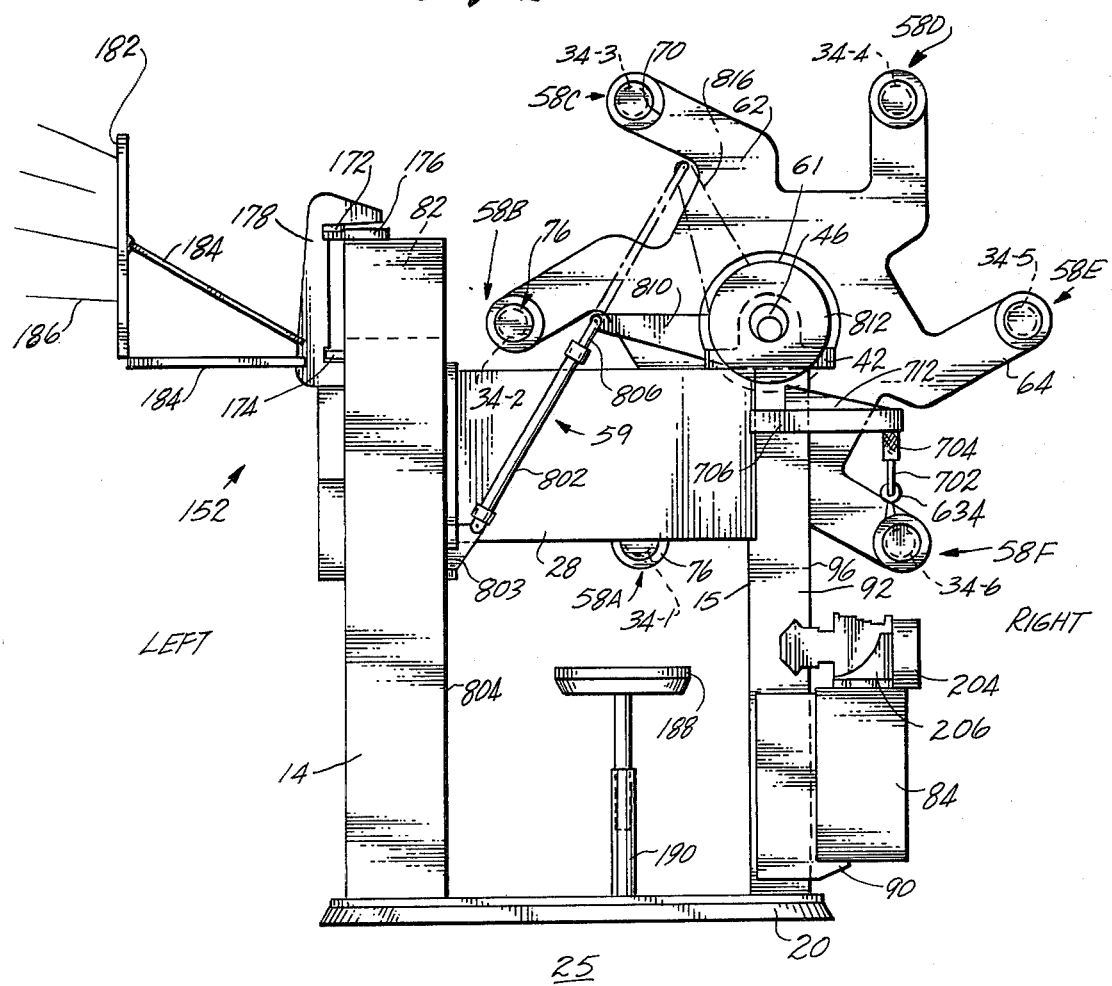
FIG. 4 is an end view of the pipe making-machine of FIG. 1 taken at the tailstock end of the machine on line 4—4.

Referring to FIGS. 9 and 10, the mandrel tailstock support assembly 76 comprises a cylindrical, horizontal outer shell 602 suspended from the gusset assembly 78, which is used to secure the tailstock support assembly to the tailstock support plate 62, as described above. The gusset assembly comprises two spaced-apart, triangular gussets 604 having an edge 606 parallel to and an edge or face 608 perpendicular to the longitudinal axis of the shell. The gussets are maintained spaced apart by a support plate 610 attached to the edge 608 of each gusset perpendicular to the axis of the shell. The edge 612 of the support plate 610 adjacent to the shell is curved to conform to the curvature of the shell. Welded to the support plate and the facing surfaces 614 of the gusset are two, spaced-apart bars 616 supporting a block 618 mounted between the bars halfway between the two gussets. The block has a horizontal hole 620 through its center. A bolt 180 is inserted through this hole into a corresponding hole 622 in a supporting arm 64 of the tailstock support plate 62. The face 608 of each gusset facing the support plate 62 has two projections 626 which seat against an arm 64 of the mandrel support plate 62. Holes 628 are provided, one in each of opposing corners of the support plate 610 to be aligned by tapered pins (not shown) on an arm 64 of the mandrel support plate to position the tailstock support assembly in appropriate relationship to the mandrel carrier tube 38. Welded to the outer surface 630 of one of the gussets 604 is a support, such as a threaded cylinder 632, for an eye bolt 634. The support is skewed relative to the surface of the gusset 604 so the eye bolt extends upwardly when the tailstock support assembly is in the pipe removal production station 58F so the eye bolt can easily be grabbed by a hook 702 (FIG. 4). The hook supports the mandrel tailstock support assembly when it is removed from a mandrel in the pipe removal production station so pipe can be stripped from the mandrel.

Within the outer shell 602 there is a rotatable inner shell 636 maintained spaced-apart from and allowed to rotate relative to the outer shell by two bearing and seal assemblies 638, one at each end of the outer shell.

A mandrel spacer assembly 640 is provided so the pipe-making machine 10 can be used to manufacture pipe of various diameters. The spacer assembly comprises a round tube 642 of shorter length than the inner shell 636. Welded to both ends of the tube is a section 644 of pipe of larger outer diameter and inner diameter than the tube. A Teflon bushing 646 is mounted against the inside of both sections 644 of pipe. The inner diameter of the bushing determines the diameter of the mandrel which can be accommodated by the spacer and thus the inside diameter of the pipe formed on the mandrel. Mandrels of smaller diameter than the mandrel 34 shown in FIGS. 11 and 12 are accommodated by using a spacer assembly having pipe of smaller internal diameter welded to the ends of the tube. Mandrels of larger diameter than the mandrel 34 are supported directly by the Teflon compound bushings 648. The spacer assembly 640 is maintained spaced apart from the inner shell 636 by another Teflon compound bushing 648 mounted around the outside of each section of pipe. The spacer assembly is held in fixed position inside the inner shell by means of bolts 650 inserted through a hole 652 in the inner shell and into a corresponding hole 654 in the spacer assembly.

The shell 636 rotates with the mandrels on the roller bearings 638. The Teflon bushings are used to prevent wear of the mandrel surface where it contacts the tailstock assembly and to facilitate quick removal of the tailstock assembly.

This tailstock support assembly described has many advantages. For example, because the support assembly is attached to an arm of the plate at the end of the mandrel carrier tube by a single bolt, the tailstock support assembly is easily removed from a mandrel. This permits faster cycle times for the machine, helps maintain low labor costs, and prevents the pipe removal step from limiting production rates. Another advantage results from use of Teflon bushings instead of lubricating oil or grease to prevent wear of the mandrel. If grease or lubricating oil were used, a mandrel could become contaminated with the lubricating fluid which could contaminate the pipe. If the end of a pipe were contaminated with the lubricating material, it would be difficult to attach two pieces of pipe together without first removing the lubricant.

The means for supporting the mandrel tailstock support assembly 76 once it is removed from a mandrel can be any support means having a hook which fits into the eyebolt 634. The preferred means, which is shown in FIGS. 1, 2 and 4, comprises a hook 702 secured by means of a swivel joint 704 to a roller (not shown) which is supported by a horizontally oriented trolley track 706. One end of the trolley track is directly above the tailstock support assembly of a mandrel in the pipe removal production station 58F. The trolley track 706 curves towards the central axis of the machine so the tailstock support assembly can be pulled out of the way of pipe as the pipe is removed from the mandrel. The track 706 is supported by three support arms including a first 708 and a second 710 support arm attached to the headstock face and tailstock face, respectively, of the right side of the tailstock cross beam 28. These two arms support the straight portion of the track. A third support arm 712 is welded at one end to the curved section of the track and at the other end to the tailstock face of the second support arm. A single operator easily handles a mandrel tailstock support assembly unbolted from the mandrel support plate with this hook and track assembly.

Figure 6:
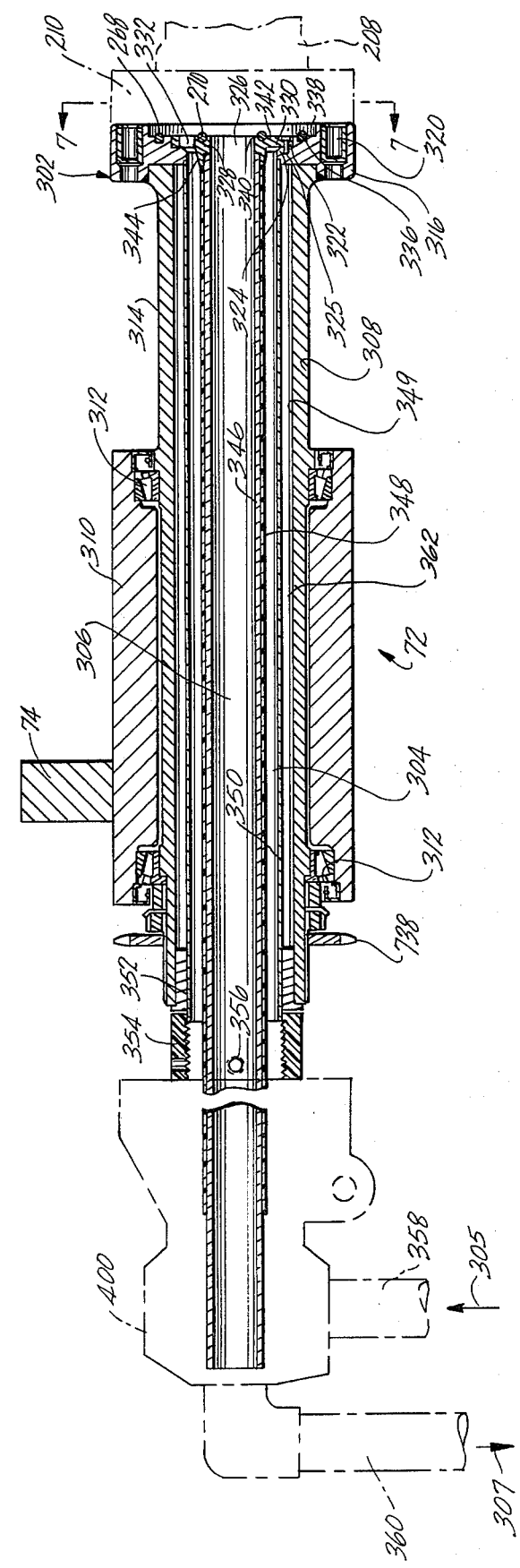
FIG. 6 is a view in partial section of a headstock spindle assembly taken along line 6—6 of FIG. 5.
Figure 7:
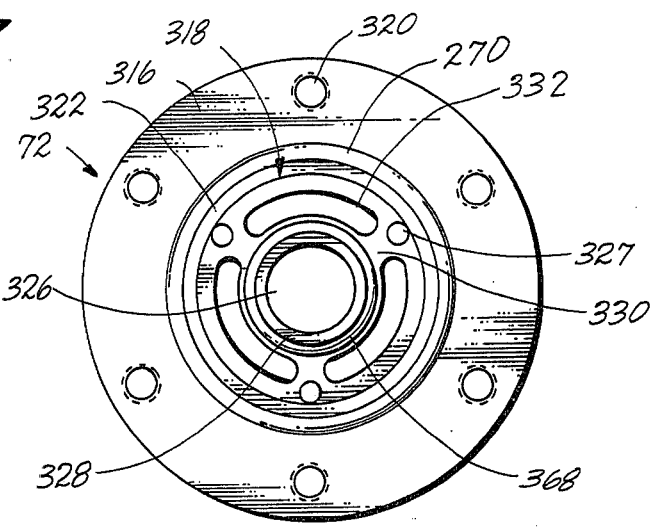
FIG. 7 is a view of a headstock spindle assembly taken on line 7—7 of FIG. 6.

As shown in FIGS. 6 and 7, the headstock support assembly 72 also provides a flow path for incoming temperature control fluid 305 and for outgoing temperature control fluid 307. The headstock support assembly has an outer, rotatable, cylindrical, elongated, hollow spindle shaft 308 mounted in a shorter nonrotating cylindrical sleeve 310. Welded to the sleeve is the flange 74 used for securing the headstock support assembly to headstock mandrel support plate 60. A bearing assembly 312 at each end of the sleeve between the sleeve 310 and the outer surface 314 of the spindle shaft allows the spindle shaft to rotate about its own longitudinal axis while the sleeve remains stationary.

At the tailstock end of the headstock support assembly is a flange assembly 302. The flange assembly comprises a radially outer flange 316 and a radially inner flange 318 which mate with the outer 210 and inner 216 flanges, respectively, at the headstock end of the mandrel 34 bolted to the mandrel headstock support assembly. The outer flange 316 is annular and the inner flange 318 is circular. The outer flange is welded to the tailstock end of the spindle shaft and has a plurality of bolt holes 320 along its periphery corresponding to the bolt holes 212 through the outer flange 210 of the mandrel 34 for bolting the mandrel headstock support assembly to a mandrel. A radially outer rim 322 of the inner flange 318 is attached to the radially inner periphery 324 of the outer flange by three screws 325 inserted through holes 327 through the rim 322. The inner flange has a circular opening 326 through its middle through which fluid passing out of the mandrel flows. The opening 326 is surrounded by a ring 328 from which spokes 330 extend radially, the spokes connecting the ring 328 to the outer rim 322. Between the spokes 330 there are three jellybean-shaped openings 332 radially equidistant from the longitudinal axis of the headstock support assembly. Temperature control fluid passing into the mandrel flows through these three openings 332.

The outer C-ring 268 used to prevent temperature control fluid from leaking out of the headstock spindle assembly is mounted in an annular recess 336 in the surface 338 of the support assembly's outer flange 316 facing the mandrel. Similarly, the inner C-ring 270, which prevents incoming temperature control fluid from mixing with outgoing spent temperature control fluid, is mounted in an annular recess 340 in the mandrel facing surface 342 of the ring 328.

The ring 328 of the inner flange 318 has an annular extension 344 projecting axially inwardly into the spindle shaft 308. Mounted on this extension 344 is an elongated central tube 346 coaxial with the spindle shaft and extending out through the spindle shaft into a nonrotating rotary union 400 at the headstock end of the mandrel headstock support assembly. There is a slip-fit between the tube and the rotary union.

A sleeve 348 formed of Teflon tubing is on the radially outer surface of the central tube and insulates incoming temperature control fluid flowing through an annular flow path 304 around the outside of the central tube from spent temperature control fluid flowing through a flow path 306 through the center of the tube.

Between the Teflon sleeve 348 and the radially inner surface 349 of the spindle shaft 308 is an outer tube 350 supported at its tailstock end by the radially inner surface of the outer flange 316 and at its headstock end by a phenolic sleeve 352 mounted on the inner surface 349 of the headstock end of the spindle shaft. Unlike the central tube, the outer tube does not extend into the rotary union. The phenolic sleeve is held in place by a thick walled metal tube 354, concentric with and radially spaced apart from the Teflon sleeve and welded to the outer tube 350. The bore of tube 354 is threaded to receive a short piece of threaded pipe (not shown) that connects the rotary union to the tube 354. Set screws 356 keeps the threaded pipe from coming unsecured when the mandrel rotates.

Incoming temperature control fluid 305 passes through the rotary union 400 and then along the annular flow path 304 between the Teflon sleeve 348 on one side and the metal tube 354 and the outer tube 350 on the other side, and then through the holes 332 in the inner flange and thence into the mandrel. Spent temperature control fluid flows out of the mandrel through the central opening 326 in the inner flange 318 and through the flow path 306 within the rotating spindle to the rotary union. An inlet line 358 and an outlet line 360 are provided from the rotary union to the source of the temperature control fluid.

In an annular region 362 between the outer tube 350 and the spindle shaft 314 is an insulating material such as air. The insulating material insulates the spindle shaft and the bearings from incoming hot temperature control fluid flowing through the annular flow path 304.

Mandrels of various diameters can be used with the same headstock spindle assembly. All that is required is that the flange at the headstock end of the mandrel have bolt holes and fluid passages corresponding to those at the flange at the tailstock end of the headstock support assembly.

Although only one mandrel, one headstock support assembly, and one tailstock support assembly have been described in detail, it should be understood that each of the six mandrels, and each of the six headstock and tailstock support spindle assemblies are substantially identical.

What has been described is a method and apparatus for passing a temperature control fluid through a rotating mandrel which permits incoming and outgoing temperature control fluid to pass through the same end of a mandrel while maintained separated. Next, a control scheme useful for providing temperature control fluid having the appropriate temperature to each of the six mandrels is described. After this, a distributor useful for transferring temperature control fluid from a stationary fluid reservoir to mandrels which are rotated between production stations, as are the mandrels 34 of this pipemaking machine 9, is described.

Figure 16:
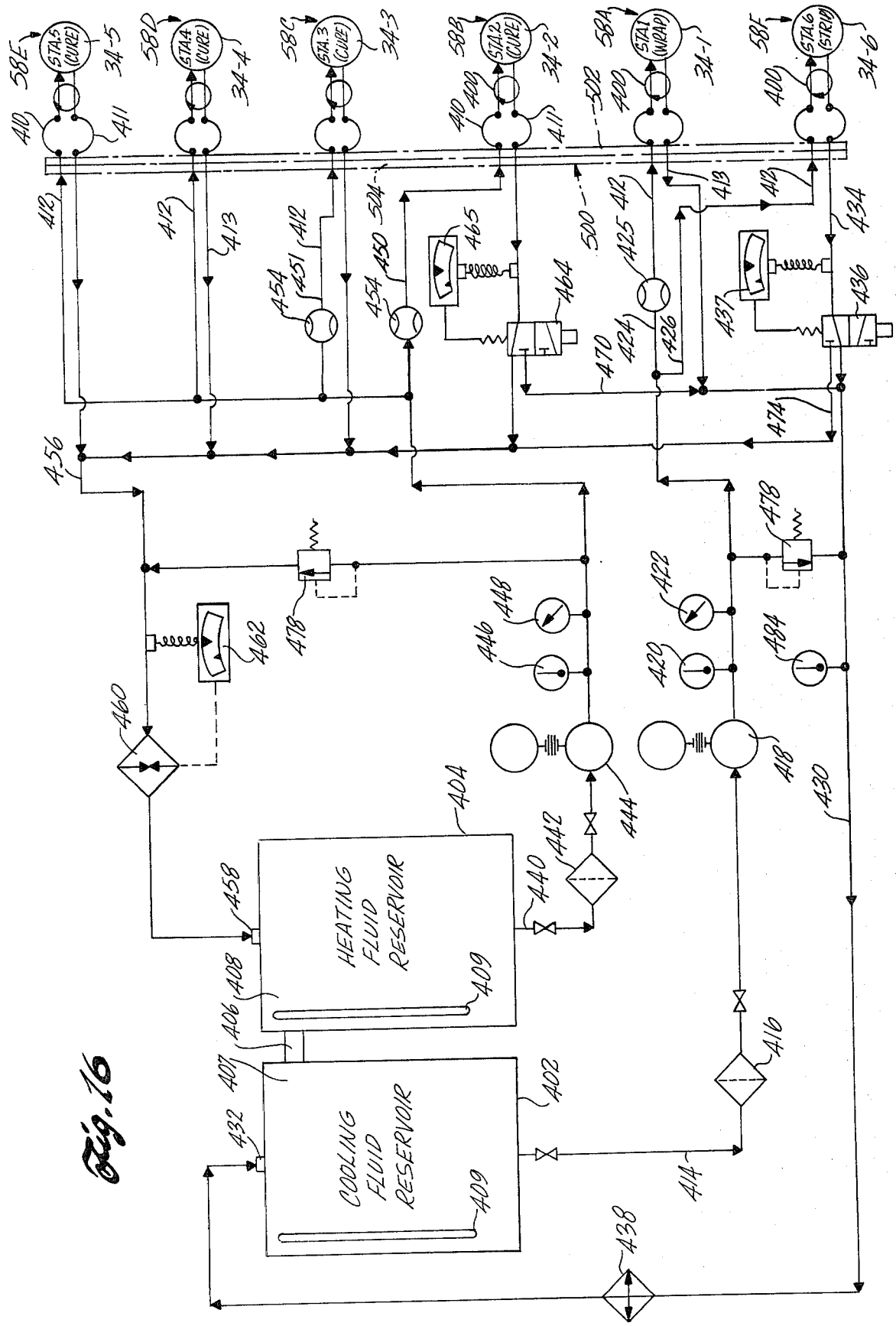
FIG. 16 is a schematic drawing of the heat transfer system of the pipe-making machine of FIG. 1.

With reference to FIG. 16, there is provided a cooling fluid reservoir tank 402, a heating fluid reservoir tank 404 and a conduit flow path 406 from the upper portion 407 of the cooling fluid reservoir to the upper portion 408 of the heating fluid reservoir. This flow path provides automatic transfer of fluid between the two reservoirs in case one of the two reservoirs becomes overfilled. Level indicators 409 are provided in each reservoir to monitor the level of fluid.

Schematically represented in FIG. 16 are the six production stations 58 A–F and a rotary union 400 for each of the six mandrels 34 occupying the production stations. Each rotary union is connected to two flex hoses, a first flex hose 410 for incoming temperature control fluid and a second flex hose 411 for outgoing spent temperature control fluid.

The ends of the flex hoses opposite the rotary union are attached to the tailstock side of a fluid distributor plate 500, described in detail below. The distributor 500 includes first and second circular plates 502, 504, respectively. The first plate faces the tailstock end of the machine, and is connected to the flexible couplings 410, 411. The first plate rotates about the axis of the carrier tube 38 as mandrels are moved between production stations. The second plate faces the headstock end of the machine, and is connected to a first pipe 412 and a second 413 pipe for each mandrel to bring temperature control fluid to and carry it from, respectively, the two reservoirs for the heating and cooling fluids. The second plate does not rotate as the mandrels revolve between production stations.

Cooling fluid maintains the temperature of the resin applied to the surface of the mandrel in the resin application production station 58A below the cure temperature of the resin. The same fluid cools the mandrel in the pipe stripping production station 58F. Cooling fluid passes out the bottom of the cooling fluid tank 402 through line 414, through a strainer 416 which removes contaminants from the fluid, and then to a pump 418. From the pump 418, the cooling fluid passes through an in-line temperature indicator 420 and an in-line pressure indicator 422. A portion of the cooling fluid then flows into a line 424 leading to the distributor 500, and then passes through a flow indicator 425, the distributor 500, a rotary union 400, and into the mandrel 34-1 in the resin application production station 58A to prevent resin being applied to the mandrel from curing. The remainder of the cooling fluid from the pump 418 flows into line 426 through the distributor plate 500 and a rotary union 400, and into the mandrel occupying pipe stripping production station 58F. Spent cooling fluid from the resin application production station 56A passes through a rotary union 400, the distributor plate 500, the pipe 413 carrying fluid from the rotary union, and then through line 430 which transfers fluid to a spent fluid inlet 432 into the cooling fluid reservoir. Spent cooling fluid from the stripping production station 58F flows through a discharge line 434, through a first three-way valve 436, and then into the line 430 leading to the cooling fluid reservoir. The three-way valve is controlled by a temperature controller 437 which senses the temperature of spent heat transfer fluid from the stripping production station.

There is a temperature indicator 484 in the main return line 430 to the cooling fluid reservoir. A cooling fluid heat transfer zone such as a shell-and-tube heat exchanger 438 is used for maintaining the temperature of the cooling fluid at a temperature below the cure temperature of the resin.

The system used for the heating fluid is similar to that used for the cooling fluid. Heating fluid flows out of the bottom of the heating fluid reservoir into line 440 through a filter 442 and is pumped by a pump 444 past a temperature indicator 446 and a pressure indicator 448 into the mandrels in the resin curing production stations 58B, 58C, 58D, and 58E for curing the resin. The temperature of the heating fluid depends upon the temperature at which the resin applied to the mandrel cures. For example, an epoxy type resin cures at about 275 to about 325 F., or higher. Flow indicators 454 are provided in the lines 450 and 451 leading to production stations 58B and 58C, respectively, for monitoring the flow of heating fluid. Heating fluid from each mandrel in a cure station passes into a main return line 456 leading to an inlet 458 at the top of the heating fluid reservoir. In the heating fluid return line 456 there is a heating fluid heat transfer zone such as an electric heater 460 controlled by a temperature controller 462 to maintain the temperature of the heating fluid above the cure temperature of the resin.

As with the fluid return line from the pipe removal production station 58F, there is provided a second three-way valve 464 in the fluid return line from the first resin curing production station 58B. The second valve 464 in is controlled by a temperature controller 465 which senses the temperature of the spent temperature control fluid from the second resin curing production station 58B.

These two valves 436 and 464 contribute to the thermal efficiency of the pipe making process. The control valves operate when the mandrels are simultaneously transferred between production stations. For example, when a mandrel is passed from the resin application production station 58A to the first resin curing production station 58B, it contains a portion of the cooling fluid used to maintain the resin on the mandrel at a temperature below the cure temperature. It would be thermally inefficient to pass this cooling fluid into the heating fluid reservoir. Therefore, the temperature controller 465 is set so that whenever the fluid passing out of the mandrel in the first resin curing production station 58B is below a set temperature, that fluid flows through a line 470 in communication with the main return line 430 to the cooling fluid reservoir 402. When the temperature of the fluid from the first cure production station becomes greater than the set temperature, the second valve 464 is actuated so the fluid flows into the main return line 456 to the heating fluid reservoir 404. Thus the heating fluid reservoir is not subjected to a slug of cold fluid every time the mandrels rotate between production stations. Preferably the set temperature is about half-way between the temperature desired in the cooling fluid reservoir and in the heating fluid reservoir. For example, when heating fluid having a temperature of about 300° F. is used for curing epoxy resin and the cooling fluid reservoir is at an ambient temperature of about 70° F., the set temperature preferably is half-way between these two temperatures, i.e. about 185° F.

Similarly, a mandrel rotated from the last resin curing production station 58E to the pipe removal production station 58F contains heating fluid. If this heating fluid were returned to the cooling fluid reservoir, the heat load on the heat extractor 438 would be increased. Thus the temperature controller valve 436 in the fluid return line 434 from the pipe removal production station 58F is set so that the spent heating fluid is diverted by the first control valve 436 to a line 474 in communication with the main heating fluid return line 456 leading to the heating fluid reservoir. When the temperature controller 437 senses the presence of cooling fluid by a drop in the temperature of the fluid in the line from the pipe removal production station 58F, the fluid is diverted to the main return line 430 to the cooling fluid reservoir 402. Preferably a temperature half-way between the heating fluid reservoir temperature and the cooling fluid reservoir temperature is used to determine when the fluid from the pipe removal station should be diverted from the heating fluid reservoir to the cooling fluid reservoir.

Both the circulating heating fluid and the circulating cooling fluid systems are provided with pressure relief valves 478. These valves are positioned upstream of the pumps of each system, and, when opened, transfer fluid from the pump discharge to the main return line leading to their respective fluid reservoirs. These relief valves function every time the mandrels are rotated to another production station because when the mandrels are between production stations, fluid is prevented from entering the mandrel because of the misalignment of the two parts of the distributor assembly, as described below. The relief valves prevent motor and pump overload while the fluid flow to the mandrels is briefly blocked during rotation of the mandrel carrier asembly. Also, if the mandrel carrier should stop in a blocked-flow position the bypass valve permits fluid to keep flowing through the fluid heater so the temperature control can operate normally and prevent overheating.

As described above, the fluid distributor assembly 500 serves the key function of transferring temperature control fluid between the stationary reservoirs and the mandrels, where the mandrels rotate about the longitudinal axis of the carrier tube 38 when the mandrels are moved between production stations.

Figure 13:
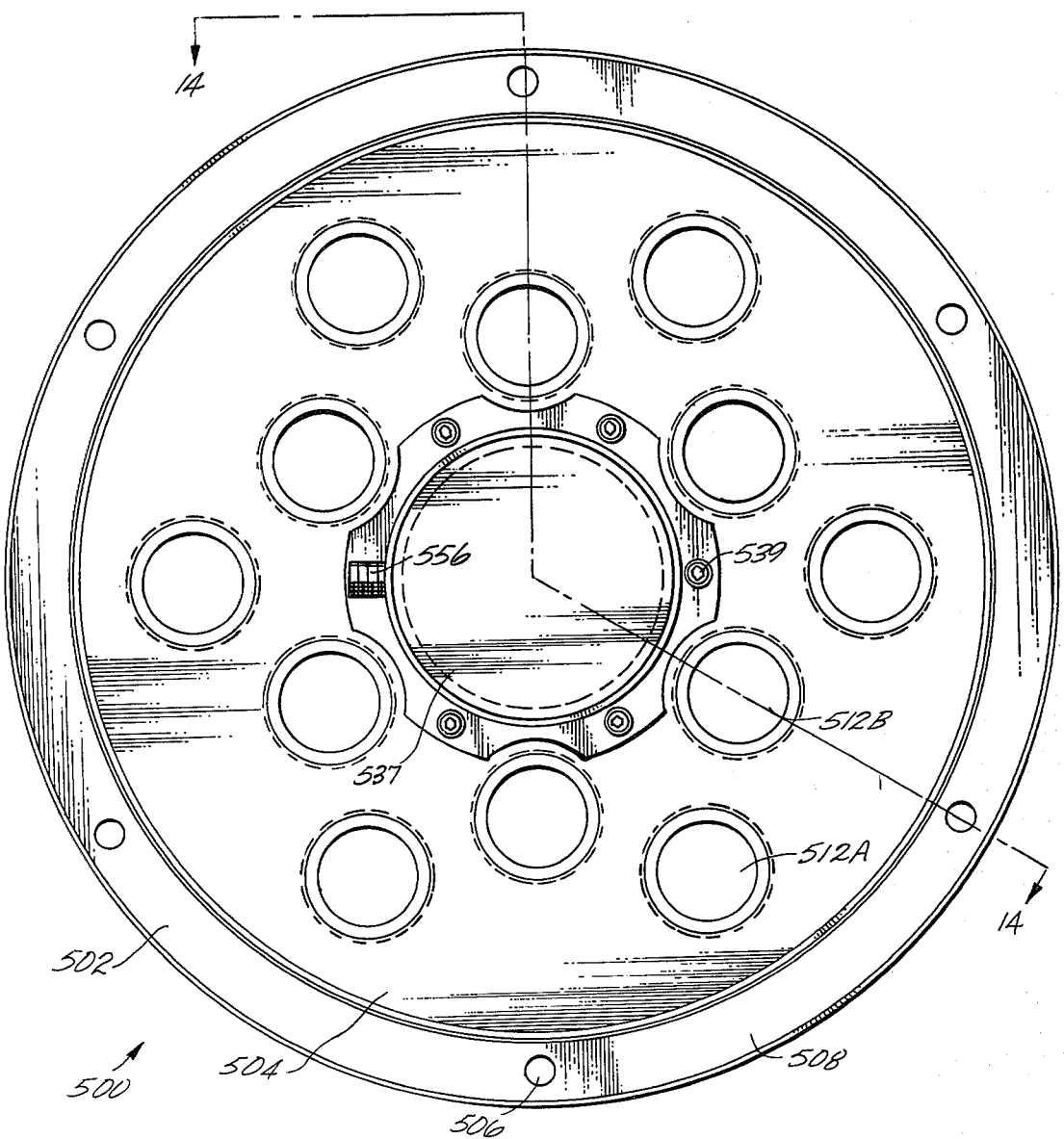
FIG. 13 is a view of the distributor assembly of the pipe-making machine taken along line 13—13 of FIG. 5.
Figure 14:
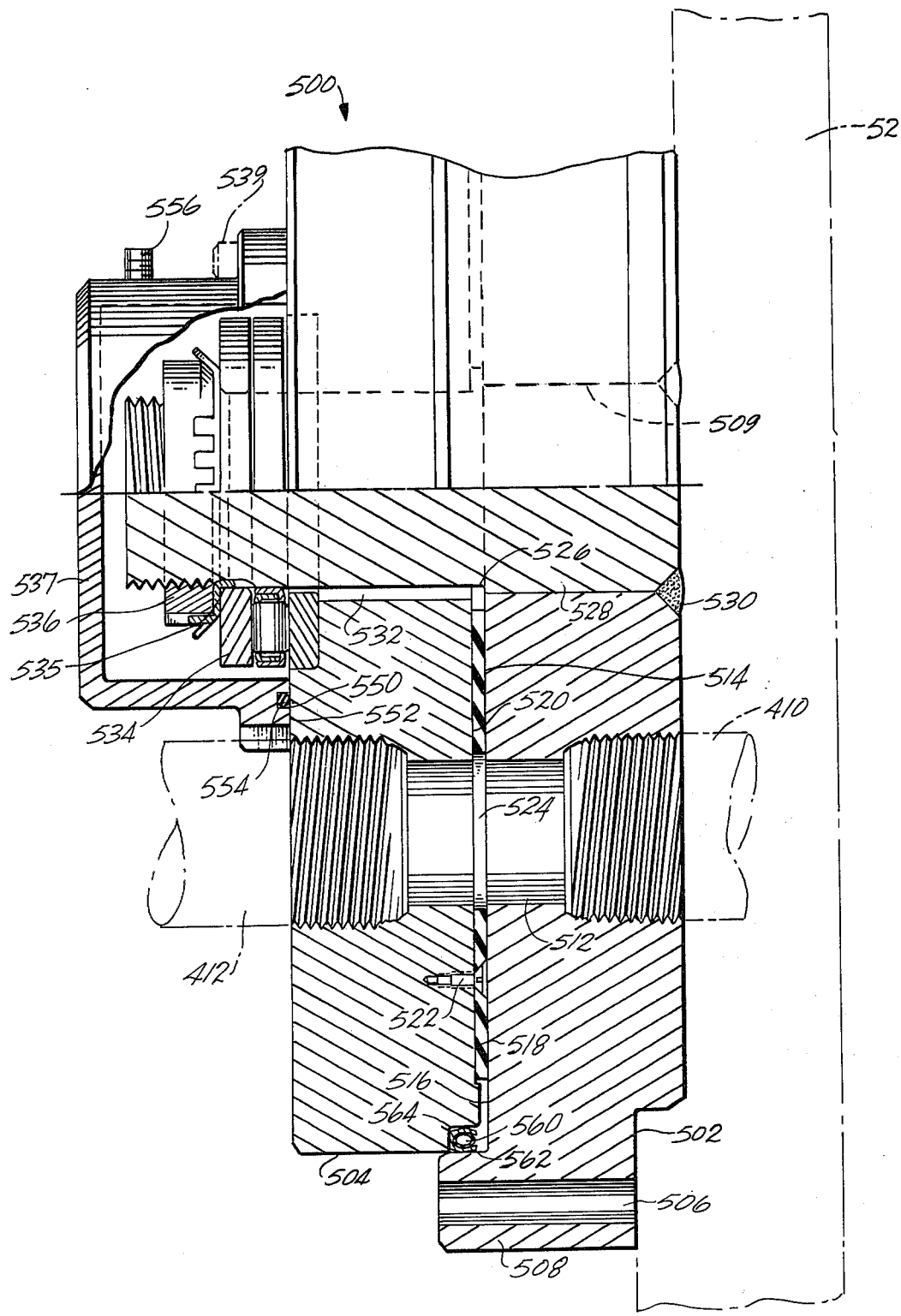
FIG. 14 is a view taken on line 14—14 of FIG. 13.

Referring to FIGS. 13 and 14, the distributor comprises two vertically oriented circular plates, a first plate 502 which is closer to the tailstock end of the machine and a second plate 504 mating with the first plate and closer to the headstock end of the machine. The plates have aligned, circular holes 509 through their centers.

The first plate, which is of larger diameter than the second plate, has six bolt holes 506 around its periphery for mounting the distributor assembly to the headstock face 510 of the vertically oriented plate 52 at the headstock end of the carrier tube 38. This is the same plate to which the bearing assembly is bolted. As the mandrels rotate about the longitudinal axis of the carrier tube, the first plate rotates about its axis by an angle substantially equal to the angle of rotation of the mandrels.

Each of the two plates 502, 504 has twelve matching holes 512 through it, a first set of six radially outer holes 512A for temperature control fluid flowing to production stations, and a second set of six radially inner holes 512B for temperature control fluid flowing away from a production station. There are two holes through each plate for each production station, one of the first set 512A and one of the second set 512B. The holes are positioned so that every second hold is radially equidistant from the central axis of the distributor assembly. The holes are at least partially threaded for pipe connections.

The headstock facing surface 514 of the first plate 502 has a circular recess 516 of the same diameter as the diameter of the second plate. The second plate fits into this recess and is maintained spaced apart from the first plate by a cylindrical gasket or bearing 518 held to the tailstock facing surface 520 of the second plate by recessed flat head screws 522. The bearing has twelve holes 524 to match the holes 512 through the plates for the temperature control fluid, and a central hole 526 to match the central hole 509 through the plates.

This bearing serves many functions. It prevents leakage of the temperature fluid through the gap between the two plates. It also stops the flow of incoming and outgoing temperature control fluid when the holes through the plate are misaligned. This occurs when the first plate rotates as the mandrels are rotated between production stations. The bearing also permits relative rotation between the first plate and the second plate. The preferred material for the bearing are poly(amide-imide) resins produced by Amoco Chemicals Corp. under the trade name Torlon, and by E. I. DuPont under the trade name Vespel. These resins exhibit a low coefficient of friction, which permits relative rotation of the two plates, and extremely high resistance to creep and wear, which is required when the holes through the plates are misaligned. The materials also have a low coefficient of thermal expansion so that when exposed to heating fluid, differential expansion between the gasket and the metal plates does not cause leakage of the temperature control fluid. Other materials which may be used for the gasket include Teflon compounds and aluminum bronze alloys.

As a backup to prevent leakage of temperature control fluid from the distributor assembly through the space between the two plates 502, 504, an O-ring 560 is provided. The O-ring is positioned between the peripheral edge 562 of the recess 516 of the first plates 502 and the corner 564 towards the tailstock end of the machine of the second plate which is recessed to accommodate the O-ring.

The means for holding the two plates 502, 504 of the distributor assembly 500 together comprises a horizontally oriented solid shaft 528 mounted in the central holes 509 of the two plates. The tailstock end of the shaft is welded to the circumferential edge 530 of the hole 509 through the center of the first plate. The opposite end of the shaft, which is threaded, projects out through the second plate. Between the second plate and the shaft there is a bronze radial bearing assembly 532 which permits the shaft to rotate as the mandrels are moved between production stations while the second plate remains stationary. Mounted on the shaft and pressed up against the headstock face of the second plate is a roller thrust bearing assembly 534 held in place by a lock washer 535 and a nut 536 mounted on the threaded end of the shaft. The nut is adjusted to provide the desired pressure on the bearing gasket 518.

A housing 537 bolted to the headstock face of the second plate with bolts 539 covers the headstock end of the shaft 528. The purpose of this housing is to collect temperature control fluid which seeps along the periphery of the shaft. A groove 550 in the surface 552 of the housing pressed against the second plate accommodates an O-ring 554 which prevents leakage of temperature control fluid out of the housing. As discussed above, preferably the temperature control fluid is a petroleum derived oil, which can have lubricating properties. Thus, by using an oil as the temperature control fluid, some lubrication is provided by the temperature control fluid between the stationary second plate and the rotating shaft and first plate.

A pipe nipple 556 is provided in open communication with the interior of the housing for removing air from the housing as it is filled with temperature control fluid for lubrication.

Variations of the distributor assembly 500 shown in FIGS. 13 and 14 are possible. These including using keys to attach the bearing 518 to the second plate instead of using screws 522. Another variation is to secure the bearing to the first plate instead of the second plate. Also, it is not necessary that both plates have the same number of holes. For example, it may be possible to operate the machine without passing cooling fluid through a mandrel in the pipe removal production stations. Therefore, there would be no need for holes through the second plate for the pipe removal production station. In this version of the invention, the second plate would have only ten holes and the first plate would have twelve holes. Whenever the number of holes in the two plates is different, the sealing means used to prevent fluid from leaking into the space between the two plates should be around each of the holes in the plate having the larger number of holes to prevent fluid from leaking from the holes not aligned with holes in the other plate.

Figure 15:
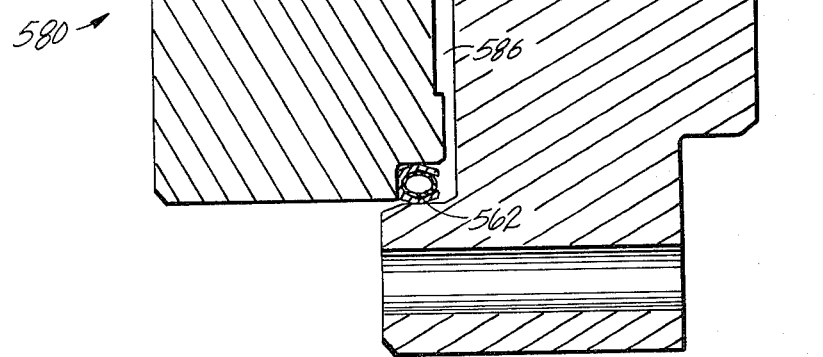
FIG. 15 is a view similar to FIG. 14 of another distributor assembly useful with the pipe-making machine of FIG. 1.

Instead of using a flat bearing which also serves as sealing means, a separate sealing means and a separate bearing can be provided as shown in the version 580 of the distributor assembly shown in FIG. 15. Instead of using the gasket 518 to maintain the two plates apart, a second thrust bearing assembly 582 axially aligned with the first thrust bearing assembly 534 described above is used. The second thrust bearing assembly is set in a recess 584 in the first plate along the periphery of the solid shaft 528. When the two plates are assembled together the lock nut 536 is tightened until the second thrust bearing sits against the first plate. To prevent fluid leakage from each of the holes through the distributor plate into the space 586 between the first and second plates, a floating seal 588, one for each of the twelve holes, is provided. Each seal sits in a recess 590 around its respective hole in the second plate and is pressed axially against the first plate by four wave springs 592 separated from each other by a washer 594. Around the outer circumference of each seal is an O-ring 596 mounted in a recess 597 in the second plate.

Because of the relatively weak force exerted by the wave springs on the floating seals 588, relative motion between the two plates easily occurs. Also, the floating seal compensates for any unevenness and wobble between the two plates, thereby preventing leakage of temperature control fluid.

Means are provided for independently rotating each of the mandrels about its own longitudinal axis. It is important to have the capability to rotate each of the mandrels in each of the production stations. When a mandrel is in the resin application production station 58A, the mandrel must be rotated to wind the lining material and the resin impregnated rovings on the mandrel. The mandrels in the resin cure production station 58B-E should be rotated to prevent resin from dripping from the mandrel as the resin cures, and in the pipe removal production station 63F, the mandrel should be rotated so that circumferential grooves can be formed in the pipe wall to attach the collar used for stripping the pipe from the mandrel.

Referring to FIG. 5, the means for individually rotating each mandrel is a hydraulic motor 67 attached to the tailstock end 702 of a cylindrical housing 704 mounted on the tailstock face 706 of the headstock mandrel support plate 60 welded to the mandrel carrier tube 38. The hydraulic motor is driven by hydraulic fluid supplied by a pump (not shown). As shown in FIG. 8, hydraulic fluid from an inlet conduit 707 passes through a hydraulic fluid union 708, through a tube 710 concentric with and contained within the hollow, horizontal, support shaft 40 at the tailstock end of the machine, out of the shaft through a flow line 711 in open communication with the tube 710 in the shaft, and through tubing (not shown) along the periphery of the mandrel carrier tube 38. Hydraulic fluid passes back to the pump by flowing through return tubing (not shown) along the length of the mandrel carrier tube and a flow line 713 in open communication with the tubing and an annular space 712 around the tube 710, through the tailstock support shaft, and out through the hydraulic union 708 through an outlet conduit 715.

As shown in FIG. 5, the hydraulic motor is coupled by means of a coupling 720 enclosed in the housing 704 to a horizontally oriented shaft 722 which extends through one of six cylindrical holes 724 in the headstock mandrel support plate 60. The shaft 722 is supported towards its tailstock end by a first bearing 726 attached to the headstock face of the headstock mandrel support plate 60 and at the opposed end by a second bearing 728 supported by a bearing mount 730 mounted on the headstock face 510 of the plate 52 at the headstock end of the mandrel carrier tube 38. The horizontal drive shaft 722 extends through a circular hole in this plate 52. Towards the headstock end 732 of the drive shaft 722 is a vertically oriented cylindrical clutch plate 734.

Each hydraulic motor drives a continuous roller chain 736 attached at one end to a sprocket 739 on the horizontal drive shaft and at the other end to the sprocket 738 mounted on the spindle shaft 308 of the mandrel headstock support assembly 72, thereby rotating the spindle and the mandrel. The roller chain 736 passes over a tensioner 737 mounted on the headstock face of an arm 64 of the headstock support plate. Each mandrel is continuously driven by its own hydraulic motor except during three stages of the process.

The first exception occurs when a mandrel is in the pipe removal production station 58F where, while pipe is being removed, the mandrel is not rotated.

The second exception occurs when a mandrel is in the resin application production station 58A where the mandrel is maintained stationary when the rovings and lining material are first attached to the mandrel.

The third exception also occurs when the mandrel is in the resin production station 58A. As lining material and rovings are wound upon the mandrel, it is important that the longitudinal movement of the liner carriage assembly 98 and the roving carriage assembly 152 be coordinated with the rotation of the mandrel. This is effected by driving the drive shaft 722 of the mandrel in the resin application production station 58A with the same drive assembly 134 used for moving the liner carriage and roving carriage assemblies along the mandrel.

In operation, all six mandrels and the entire mandrel carrier assembly, including the carrier tube, the headstock and tailstock mandrel support plates, and the six headstock and tailstock mandrel support assemblies, rotate clockwise and stepwise in 60 increments about the longitudinal axis of the carrier tube. Means for causing this rotation are described below. When the mandrel which was in the pipe removal production station 58F reaches the resin application production station 58, the end 732 of the drive shaft 722 for the mandrel in the resin application production station engages a hole 733 in a clutch disc 742 driven by the main drive assembly 132. The end of this drive shaft 722 is chamfered so that it can easily slip into the horizontally oriented hole 733. This engagement holds the mandrel support assembly in fixed relationship to the drive assembly. A clutch disc 742 at the end of the drive shaft of the main drive assembly has a layer 746 of material having a high coefficient of friction. This clutch disc 742 engages the clutch plate 734 towards the end of the mandrel drive shaft. As the main drive assembly drive shaft rotates, this causes the mandrel drive shaft 722 to rotate due to the engagement between the clutch plate and the clutch disc, thereby pulling the roller chain 736 and causing the spindle 308 and the mandrel to correspondingly rotate.

As the clutch plate 742 engages the clutch disc 734, a valve 754 is actuated which causes hydraulic fluid flowing to the hydraulic motor for the mandrel in the resin application production station 58A to bypass the motor to allow the main drive assembly to drive the mandrel.

When the clutch plate engages the clutch disc, it presses against a bolt 764 at the end of a horizontally oriented push rod 756 which extends through a hole in the plate 52 at the headstock end of the mandrel carrier tube 38, this actuates the valve. The push rod is supported by a collar 758 welded to the plate 52.

After the apparatus for rotating the mandrels between production stations is actuated, the main drive assembly disengages from the drive shaft 722 for the mandrel in the resin application production station. This releases the push rod 756 operating the valve 754 and the hydraulic motor 67 takes over again. Thus the mandrel with freshly applied resin on its surface rotates about its own axis even before it reaches a resin curing production station. This feature of the machine is important because it minimizes resin loss due to dripping which occurs with a nonrotating mandrel and results in production of pipe of uniform wall thickness.

When the mandrel is being cleaned and release agent is being applied to the surface of the mandrel when it is in production station 58F, it is necessary to rotate the mandrel at a higher speed than it is rotated in the curing production stations to insure that each portion of the mandrel is thoroughly cleaned and coated. Therefore, a valve (not shown) is provided which, when actuated, increases the speed of the hydraulic motor for the mandrel in a pipe removal production station, thereby increasing the revolutions per minute of that mandrel.

The drive assembly 59 for simultaneously rotating the six mandrels counterclockwise to the next production station is shown most clearly in FIG. 4. The drive assembly comprises a cylinder assembly 802 supported by a bracket 803 attached to the right face 804 of the left column 114 at the tailstock end of the machine. The cylinder assembly extends upwardly and away from the column. A piston rod 806 of the cylinder assembly is attached to a clutch arm 810 of a clutch 812 mounted on the hollow shaft 40 which supports the tailstock end of the mandrel carrier tube 38.

To rotate the mandrels between production stations, an operator actuates a control system which causes the following steps to sequentially occur:

(1) The clutch 812 is engaged while the clutch plate 734 at the headstock of the machine is disengaged from the clutch disc 742 of the main drive 134 to permit the mandrel support assembly to rotate;

(2) the piston rod extends to the position shown by phantom line 816 in FIG. 4, thereby causing the entire mandrel support assembly, as well as the mandrels, to rotate 60° around the central axis of the mandrel carrier tube; and (3) the clutch disc 742 engages the clutch plate 734 of the mandrel which rotated into the resin application production station 58A while the clutch 812 disengages and the piston rod retracts.

These steps can occur automatically, or an operator can actuate individual control means for effecting each of these steps.

Although the process and apparatus of this invention have been described in terms of a preferred version, other versions of this invention are obvious to those skilled in the art. For example, although the machine has been described with the number of mandrels and the number of production stations equal, the machine can have more mandrels than production stations, or more production stations than mandrels.

Also, although the machine is shown as having six mandrels, one for resin application, four for resin cure, and one for pipe removal, it is within the scope of this invention to have fewer than or more than six mandrels with a different ratio than the 4:1:1 ratio. However, there must be at least one resin application station, one resin curing station, and one pipe removal station. The ratio of the number of resin curing stations to the number of resin application stations and pipe removal stations depends upon how much time is required to cure resin on the surface of a mandrel compared to the time for applying the resin, lining material, and rovings to a mandrel, and the time required to remove formed pipe from a mandrel. Depending upon the amount of time required for cure, more than or fewer than four resin curing stations can be provided for each resin application station and each pipe removal station.

What is claimed is:

1. A method for making plastic pipe comprising the steps of:
   (a) disposing elongated, hollow mandrels around a central axis so the longitudinal axis of each mandrel is substantially parallel to the central axis;
   (b) revolving the mandrels around the central axis so each mandrel successively passes through a resin application station, a resin curing station, and a pipe removal station;
   (c) maintaining a first body of heat transfer liquid at a temperature sufficiently high to cause rapid curing of the resin;
   (d) maintaining a second body of heat transfer liquid at a second temperature substantially lower than the first;
   (e) rotating a mandrel about its respective longitudinal axis while it is at the resin application station;
   (f) applying uncured resin to the rotating mandrel at the resin application station;
   (g) revolving the resin-coated mandrel about the central axis from the resin application station to a resin-curing station thereby connecting the mandrel to the first body of heat transfer liquid;
   (h) flowing heat transfer liquid from the first body through the resin-coated mandrel while rotating the mandrel at the resin curing station about its longitudinal axis to cure at least partially the resin on the mandrel to form at least partially cured pipe;
   (i) revolving the mandrel and the at least partially cured pipe about the central axis from the curing station to the pipe removal station thereby disconnecting the mandrel from the the first body of heat transfer liquid and connecting it to the second body of heat transfer liquid while preventing the liquid in the mandrel from leaking out;
   (j) flowing heat transfer liquid from the second body through the mandrel while the mandrel is at one of the other stations; and
   (k) removing the at least partially cured pipe from the mandrel while preventing the liquid in the mandrel from leaking out.

2. A method according to claim 1 which includes the step of flowing heat transfer liquid from the second body through the mandrel while it is at the pipe removal station.

3. A method according to claim 1 or 2 which includes the step of flowing heat transfer liquid from the second body through the mandrel while it is at the resin application station.

4. A method according to claim 1 or 2 in which each mandrel has an inlet and an outlet at one end, the other end of each mandrel being closed, and which includes the step of flowing heat transfer liquid into the mandrel inlet, through a substantial length of the mandrel, and out the mandrel outlet while rotating the resin-coated mandrel at the resin curing station.

5. A method according to claim 1 or 2 which includes the step of rotating the mandrel about its longitudinal axis while revolving the mandrel about the central axis from the resin application station to the resin curing station.

6. A method according to claim 1 or 2 which includes the step of passing the resin-coated mandrel through a plurality of curing stations.

7. A method according to claim 1 or 2 which includes the step of revolving the mandrel from one station to another without decreasing the amount of liquid in the mandrel.

8. A method according to claim 1 or 2 which includes the step of sensing the temperature of the liquid leaving the mandrel, and causing that liquid to flow to the first body when the temperature of that liquid is above one temperature, and causing that liquid to flow to the second body when the temperature of that liquid is below the said one temperature.

* * * * *